(12) United States Patent
Walsky

(10) Patent No.: US 7,206,756 B1
(45) Date of Patent: Apr. 17, 2007

(54) SYSTEM AND METHOD FOR FACILITATING COMMERCIAL TRANSACTIONS OVER A DATA NETWORK

(75) Inventor: Joshua P. Walsky, Austin, TX (US)

(73) Assignee: Trilogy Development Group, Inc., Austin, TX (US)

( * ) Notice: Subject to any disclaimer, the term of this patent is extended or adjusted under 35 U.S.C. 154(b) by 250 days.

(21) Appl. No.: 09/760,061

(22) Filed: Jan. 12, 2001

Related U.S. Application Data

(60) Provisional application No. 60/176,117, filed on Jan. 14, 2000.

(51) Int. Cl.
*G06Q 30/00* (2006.01)

(52) U.S. Cl. .............................. 705/26; 705/27; 705/20; 705/36 R; 709/203; 709/206; 235/381; 345/25; 706/47; 715/744

(58) Field of Classification Search ................ 705/26, 705/27, 20, 36 R; 235/381; 463/25; 345/25; 706/47; 709/203, 206
See application file for complete search history.

(56) References Cited

U.S. PATENT DOCUMENTS

| | | | |
|---|---|---|---|
| 4,799,156 A | 1/1989 | Shavit et al. ................ 364/401 |
| 4,992,940 A | 2/1991 | Dworkin ..................... 364/401 |
| 5,193,056 A | 3/1993 | Boes .......................... 364/408 |
| 5,361,199 A | 11/1994 | Shoquist et al. ............... 705/26 |
| 5,515,524 A | 5/1996 | Lynch et al. ................. 395/500 |
| 5,694,551 A | 12/1997 | Doyle et al. ................... 705/26 |
| 5,708,798 A | 1/1998 | Lynch et al. ................. 395/500 |
| 5,710,887 A | 1/1998 | Chelliah et al. .............. 395/226 |
| 5,732,400 A | 3/1998 | Mandler et al. ............... 705/26 |
| 5,734,150 A * | 3/1998 | Brown et al. ................ 235/381 |
| 5,742,931 A | 4/1998 | Spiegelhoff et al. ........... 705/8 |
| 5,745,681 A | 4/1998 | Levine et al. ............ 395/200.3 |

(Continued)

FOREIGN PATENT DOCUMENTS

WO     WO 93/24892     12/1993

(Continued)

OTHER PUBLICATIONS

Fixmer, Andrew H.; "Let's Make a Deal, Now on the Web"; New York times; Late Edition, East Coast; New York; Dec. 24, 1999; p. F.1, extracted on Internet from http://proquest.umi.com on Jan. 7, 2004.*

(Continued)

*Primary Examiner*—Yogesh C. Garg
(74) *Attorney, Agent, or Firm*—Hamilton & Terrile, LLP

(57) ABSTRACT

A method, a computer system and a computer program product to facilitate comparison-price shopping over a data network, such as the Internet, is provided that includes a price availability feature guaranteeing a price of a product associated with product-related information stored on a server. To that end, information that concerns a product is rendered on a display in a browser window. The information rendered typically includes offered price data. A server is provided that includes a plurality of addresses in an address space, and a subportion of the plurality of addresses is associated with an identification code. Acceptance to the offered price data is achieved by storing the information in the subportion, defining agreed price data. The agreed price data is maintained in the absence of a predetermined system event.

45 Claims, 42 Drawing Sheets

U.S. PATENT DOCUMENTS

| | | | |
|---|---|---|---|
| 5,749,785 A * | 5/1998 | Rossides | 463/25 |
| 5,758,328 A | 5/1998 | Giovannoli | 705/26 |
| 5,825,651 A | 10/1998 | Gupta et al. | 364/468.09 |
| 5,842,178 A | 11/1998 | Giovannoli | 705/26 |
| 5,842,218 A | 11/1998 | Robinson | 707/102 |
| 5,844,554 A * | 12/1998 | Geller et al. | 345/744 |
| 5,852,809 A | 12/1998 | Abel et al. | 705/26 |
| 5,873,069 A * | 2/1999 | Reuhl et al. | 705/20 |
| 5,878,400 A | 3/1999 | Carter, III | 705/20 |
| 5,893,076 A | 4/1999 | Hafner et al. | 705/28 |
| 5,895,454 A | 4/1999 | Harrington | 705/26 |
| 5,895,468 A | 4/1999 | Whitmer, Jr. | 707/10 |
| 5,918,214 A | 6/1999 | Perkowski | 705/27 |
| 5,924,082 A | 7/1999 | Silverman | 75/37 |
| 5,926,817 A | 7/1999 | Christeson et al. | 707/10 |
| 5,930,779 A | 7/1999 | Knoblock et al. | 705/412 |
| 5,937,390 A | 8/1999 | Hyodo | 705/14 |
| 5,940,807 A | 8/1999 | Purcell | 705/26 |
| 5,950,177 A | 9/1999 | Lupien et al. | 705/37 |
| 5,960,411 A | 9/1999 | Hartmann et al. | 705/26 |
| 5,963,915 A | 10/1999 | Kirsch | 709/203 |
| 5,970,470 A | 10/1999 | Walker et al. | 705/14 |
| 5,970,472 A | 10/1999 | Allsop et al. | 705/26 |
| 5,970,475 A | 10/1999 | Barnes et al. | 705/27 |
| 5,974,406 A | 10/1999 | Bisdikian et al. | 707/1 |
| 5,978,776 A | 11/1999 | Seretti et al. | 705/26 |
| 5,978,785 A | 11/1999 | Johnson et al. | 706/54 |
| 5,987,423 A | 11/1999 | Arnold et al. | 705/14 |
| 5,991,739 A | 11/1999 | Cupps et al. | 705/26 |
| 6,002,854 A | 12/1999 | Lynch et al. | 395/500.01 |
| 6,012,051 A | 1/2000 | Sammon et al. | 706/52 |
| 6,014,644 A | 1/2000 | Erickson | 705/37 |
| 6,016,504 A | 1/2000 | Arnold et al. | 709/200 |
| 6,029,141 A * | 2/2000 | Bezos et al. | 705/27 |
| 6,047,264 A | 4/2000 | Fisher et al. | 705/26 |
| 6,061,057 A | 5/2000 | Knowlton et al. | 345/744 |
| 6,119,101 A | 9/2000 | Peckover | 705/26 |
| 6,125,352 A * | 9/2000 | Franklin et al. | 705/26 |
| 6,131,087 A | 10/2000 | Luke et al. | 705/26 |
| 6,134,548 A | 10/2000 | Gottsman et al. | 707/5 |
| 6,141,006 A | 10/2000 | Knowlton et al. | 705/26 |
| 6,141,653 A | 10/2000 | Conklin et al. | 705/80 |
| 6,151,588 A | 11/2000 | Tozzoli et al. | 705/37 |
| 6,167,378 A | 12/2000 | Webber | 705/8 |
| 6,167,383 A * | 12/2000 | Henson | 705/26 |
| 6,236,972 B1 | 5/2001 | Shkedy | 705/1 |
| 6,249,772 B1 | 6/2001 | Walker et al. | 705/26 |
| 6,260,024 B1 | 7/2001 | Shkedy | 705/37 |
| 6,282,517 B1 * | 8/2001 | Wolfe et al. | 705/26 |
| 6,282,550 B1 | 8/2001 | Venkatesan et al. | 707/104.1 |
| 6,295,513 B1 | 9/2001 | Thackston | 703/1 |
| 6,317,722 B1 | 11/2001 | Jacobi et al. | 705/14 |
| 6,332,135 B1 | 12/2001 | Conklin et al. | 705/80 |
| 6,338,050 B1 | 1/2002 | Conklin et al. | 705/80 |
| 6,339,763 B1 * | 1/2002 | Divine et al. | 705/27 |
| 6,351,738 B1 | 2/2002 | Clark | 705/37 |
| 6,370,653 B1 | 4/2002 | Ichinohe et al. | 709/223 |
| 6,405,174 B1 | 6/2002 | Walker et al. | 705/26 |
| 6,405,176 B1 | 6/2002 | Toohey | 705/26 |
| 6,405,308 B1 | 6/2002 | Gupta et al. | 713/1 |
| 6,442,528 B1 | 8/2002 | Notani et al. | 705/9 |
| 6,507,822 B1 * | 1/2003 | Walker et al. | 705/20 |
| 6,553,350 B2 | 4/2003 | Carter | 705/20 |
| 6,574,608 B1 | 6/2003 | Dahod et al. | 705/26 |
| 6,587,827 B1 | 7/2003 | Hennig et al. | 705/1 |
| 6,598,026 B1 * | 7/2003 | Ojha et al. | 705/26 |
| 6,604,093 B1 * | 8/2003 | Etzion et al. | 706/47 |
| 6,606,603 B1 | 8/2003 | Joseph et al. | 705/26 |
| 6,631,365 B1 | 10/2003 | Neal et al. | 707/2 |
| 6,651,217 B1 | 11/2003 | Kennedy et al. | 715/507 |
| 6,671,716 B1 * | 12/2003 | Diedrichsen et al. | 709/203 |
| 6,675,294 B1 | 1/2004 | Gupta et al. | 713/1 |
| 6,778,968 B1 * | 8/2004 | Gulati | 705/36 R |
| 6,901,430 B1 * | 5/2005 | Smith | 709/206 |
| 6,963,847 B1 | 11/2005 | Kennedy et al. | 705/8 |
| 2001/0011222 A1 | 8/2001 | McLauchlin et al. | 705/1 |
| 2002/0013731 A1 | 1/2002 | Bright et al. | 705/22 |
| 2003/0144852 A1 | 7/2003 | Eckert et al. | 705/1 |

FOREIGN PATENT DOCUMENTS

| | | | |
|---|---|---|---|
| WO | WO 98/19259 | * | 5/1998 |
| WO | WO2003075195 | | 9/2001 |

OTHER PUBLICATIONS

"pcOrder's Solutions: Software, Content and Community," http://corporate.pcorder.com/solutions/, Feb. 17, 2000, 1 page.

"pcOrder: Technology Overview," http://corporate.pcorder.com/technology/, Feb. 17, 2000, 1 page.

"pcOrder: Products," http://corporate.pcorder.com/products/, Feb. 17, 2000, 1 page.

"pcOrder: Products/eStation," http://corporate.pcorder.com/products/estation/estation.pdf/, Feb. 17, 2000, 14 pages.

"pcOrder: Products/eStation/Features," http://corporate.pcorder.com/products/estation/features.asp, Feb. 17, 2000, 1 page.

"pcOrder: Products/eStation/Benefits," http://corporate.pcorder.com/products/estation/benefits.asp, Feb. 17, 2000, 2 pages.

* cited by examiner

WE'RE NOW NATIONWIDE AND HAVE ADDED NEW TOOLS AND FEATURES TO PROVIDE HAPPY CAR BUYING TO EVERYONE.

ENTER THE SITE 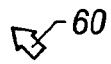

TIME TO CLEAN OUT THE GARAGE?
IF YOU PREVIOUSLY CREATED A VIRTUAL GARAGE ON OUR OLD SITE, YOU'LL NEED TO CREATE A NEW USER ACCOUNT AND REBUILD ANY CARS YOU SAVED TO YOUR VIRTUAL GARAGE TO TAKE ADVANTAGE OF NEW FEATURES AND FUNCTIONALITY ON OUR NEW SITE. ACCOUNTS CREATED ON THE PREVIOUS CARORDER SITE ARE NOT COMPATIBLE WITH OUR NEW SITE.

HOWEVER, IF YOU BUILT AND SAVED A CAR ON THE OLD SITE IN THE LAST 7 DAYS AND WOULD LIKE TO PURCHASE IT NOW, A CUSTOMER SERVICE ADVISOR WILL GLADLY HELP YOU PLACE THE ORDER FOR THAT CAR. PLEASE CONTACT THEM AT: 1.888.657.2277.

WE ARE CURRENTLY UNABLE TO SELL CARS IN THE STATE OF TEXAS. FEEL FREE TO BROWSE THE SITE.

 OUR SITE WORKS BEST USING IE 4.0 OR GREATER.
<<GET IT HERE.

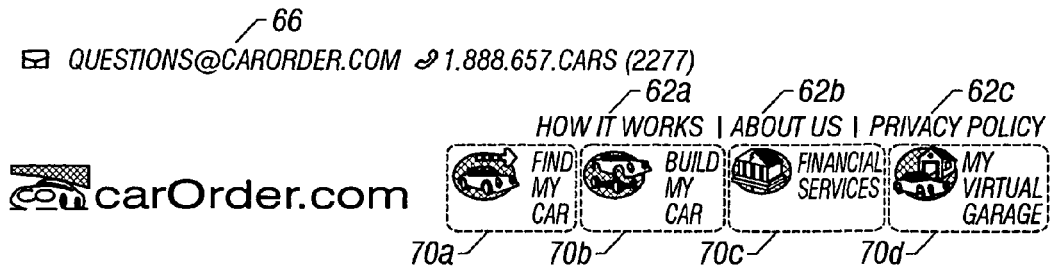

✉ QUESTIONS@CARORDER.COM  ☏ 1.888.657.CARS (2277)

HOW IT WORKS | ABOUT US | PRIVACY POLICY

FIND MY CAR | BUILD MY CAR | FINANCIAL SERVICES | MY VIRTUAL GARAGE

User Profile: Create a New carOrder.com Account

PLEASE COMPLETE THE FIELDS BELOW TO OBTAIN A CARORDER.COM ACCOUNT. LOGGING INTO YOUR ACCOUNT WILL PROVIDE ACCESS TO CONFIGURATIONS YOU'VE SAVED.

Required Account Information

PLEASE FILL OUT THESE FIELDS TO CREATE YOUR CARORDER.COM ACCOUNT. YOU MAY ALSO COMPLETE THE OPTIONAL ACCOUNT INFORMATION (BELOW), BUT ONLY THE ITEMS MARKED WITH THE RED ASTERISK (*) ARE REQUIRED TO CREATE YOUR ACCOUNT.

Please enter your First Name:*

Please enter your Last Name:*

Please enter a unique name to identify yourself:*

THIS IS THE "USER NAME" YOU'LL USE TO LOG INTO YOUR CARORDER.COM ACCOUNT WHEN YOU RETURN.

Please enter a 5 to 10 character password:*

SELECT A PASSWORD THAT YOU WILL REMEMBER; YOU'LL NEED IT TO LOG INTO YOUR CARORDER.COM ACCOUNT WHEN YOU RETURN.

Please re-enter your password for verification:*

Please enter a valid email address:*

WE'LL USE THIS ADDRESS TO CONTACT YOU DURING THE DELIVERY PROCESS, SO IT'S IMPORTANT THAT THIS BE A VALID EMAIL ADDRESS.

Please enter your zip code:*

BE SURE TO PROVIDE YOUR CORRECT ZIP CODE; WE USE IT TO CALCULATE LOCAL TAXES AND FEES (SUCH AS STATE VEHICLE REGISTRATION) ON THE VEHICLES YOU CONFIGURE.

YOU WILL BE ABLE TO CHANGE YOUR ZIP CODE LATER, BUT REMEMBER THAT CALCULATING YOUR FINAL PRICE IS DEPENDENT ON REGION. CHANGING YOUR ZIP CODE REQUIRES RE-PRICING YOUR CAR. IF YOU CHANGE YOUR ZIP CODE, YOU MAY ALSO HAVE TO CHANGE THE STATE, COUNTY, AND MUNICIPALITY WHERE THIS PURCHASE WILL INCUR TAXES OR OTHER FEES, SUCH AS VEHICLE REGISTRATION.

(CARORDER.COM IS NOT RESPONSIBLE FOR PRICING ERRORS RESULTING FROM INCORRECT INFORMATION SUPPLIED BY THE CUSTOMER.)

☐ PLEASE SEND ME EMAIL ABOUT SPECIAL OFFERS AND OTHER CARORDER.COM NEWS.

☐ DON'T SHARE MY SPECIFIC INFORMATION WITH REPUTABLE CARORDER.COM PARTNERS.

FIG. 5A

*How did you hear about carOrder.com?**

- ☐ RADIO AD /67a
- ☐ TELEVISION AD /67b
- ☐ MAGAZINE AD /67c
- ☐ NEWSPAPER AD /67d
- ☐ FRIEND /67e
- ☐ RADIO NEWS STORY /67f
- ☐ TELEVISION NEWS STORY /67g
- ☐ MAGAZINE NEWS STORY /67h
- ☐ NEWSPAPER NEWS STORY /67i
- ☐ OTHER /67j

/70e
<u>CREATE</u> MY ACCOUNT

*Optional Account Information*

THE FOLLOWING INFORMATION IS MAINTAINED IN YOUR USER PROFILE. YOU MAY FILL IT OUT NOW IF YOU'D LIKE, BUT IT'S NOT REQUIRED TO ESTABLISH YOUR ACCOUNT. THIS INFORMATION WILL BE USED WHEN YOU PLACE AN ORDER WITH CARORDER.COM.

Street Address: /65h

Apartment/Suite: /65j

City: /65i

Daytime Phone Number: ( ) - 
65h / 65l / 65m

Evening Phone Number: ( ) - 
65n / 65o / 65p

Date of Birth: / / 
65q / 65r / 65s

<u>CREATE</u> MY ACCOUNT

/62t /62u /62v /62w /62x /62y
·<u>HOME</u> | <u>FAQS</u> | <u>CONTACT</u> | <u>PRESS</u> | <u>JOBS</u> | <u>TERMS</u>

FIG. 5B

✉ QUESTIONS@CARORDER.COM  ✆ 1.888.657.CARS (2277)

80

HOW IT WORKS | ABOUT US | PRIVACY POLICY

Find My Car

USE THE TOOLS BELOW TO RESEARCH THE MANY OPTIONS AND FEATURES EACH CAR OFFERS, TO FIND THE RIGHT ONE FOR YOU.

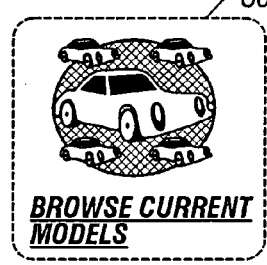 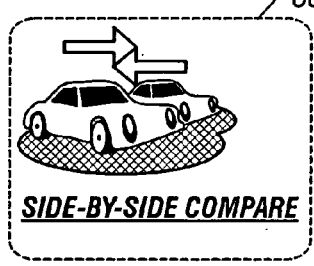 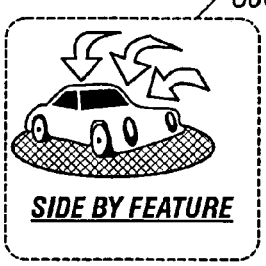

— 80a  — 80b  — 80c

BROWSE CURRENT MODELS  |  SIDE-BY-SIDE COMPARE  |  SIDE BY FEATURE

LEARN ABOUT OUR COMPLETE SELECTION OF CARS, TRUCKS, AND SUVS.  |  COMPARE FEATURES ON BASE MODELS AND SAVED CARS FROM YOUR VIRTUAL GARAGE.  |  FIND CARS THAT MEET THE SPECIFIC CRITERIA YOU'RE LOOKING FOR.

>>START HERE  |  >>START HERE  |  >>START HERE

— 80d  — 80e  — 80f

HOME | FAQS | CONTACT | PRESS | JOBS | TERMS

FIG. 7

✉ QUESTIONS@CARORDER.COM ✆ 1.888.657.CARS (2277)

carOrder.com™  FIND MY CAR  BUILD MY CAR  FINANCIAL SERVICES  MY VIRTUAL GARAGE

Browse: Select Manufacturer

◄◄◄ BACK TO FIND MY CAR

| PICK A MODEL FROM THE SELECTIONS BELOW | | | | |
|---|---|---|---|---|
| *Manufacturers* | | | | |
| ACURA | AUDI | BMW | BUICK | CADILLAC |
| CHEVROLET | CHRYSLER | DAEWOO | DODGE | FORD |
| GMC | HONDA | HYUNDAI | INFINITI | JAGUAR |
| JEEP | KIA | LAND ROVER | LEXUS | LINCOLN |
| MAZDA | MERCEDES | MERCURY | MITSUBISHI | NISSAN |
| OLDSMOBILE | PONTIAC | SUZUKI | TOYOTA | VOLKWAGEN |
| VOLVO | | | | |

ARE WE MISSING A MANUFACTURER YOU'RE INTERESTED IN?
CLICK HERE TO TELL US WHAT YOU'D LIKE TO SEE.

HOME | FAQS | CONTACT | PRESS | JOBS | TERMS

FIG. 8

✉ QUESTIONS@CARORDER.COM ✆ 1.888.657.CARS (2277)

Browse: Select Model

◄◄◄ BACK TO <u>FIND MY CAR</u> OR PICK A NEW <u>MANUFACTURER</u>

| PICK A MODEL FROM THE SELECTIONS BELOW | | |
|---|---|---|
| *Ford* | | |
| 84b | 2000 Contour <br> THE MID-LEVEL FORD CONTOUR SEDAN COMES WITH 5 SPEED MANUAL TRANSMISSION AND IS AVAILABLE IN TWO DIFFERENT TRIMS. | <u>LEARN MORE...</u> —84c <br> <u>BUILD IT...</u> —84d |
| 84e | 2000 Crown Victoria <br> THE REAR WHEEL DRIVE CROWN VICTORIA, FORD'S LARGEST SEDAN, HAS AUTOMATIC TRANSMISSION AND SEATS SIX ADULTS. | <u>LEARN MORE...</u> —84f <br> <u>BUILD IT...</u> —84g |
| 84h | 2000 Escort <br> THE TWO DOOR ESCORT COUPE, FORD'S MOST AFFORDABLE MODEL, COMES IN A SINGLE TRIM WITH A CHOICE OF MANUAL OR AUTOMATIC TRANSMISSION. | <u>LEARN MORE...</u> —84i <br> <u>BUILD IT...</u> —84j |
| 84k | 2000 Expedition <br> THE EXPEDITION, FORD'S LARGEST SPORT UTILITY VEHICLE AFTER THE EXCURSION, SEATS NINE AND COMES WITH REAR WHEEL OR ON-DEMAND FOUR WHEEL DRIVE. | <u>LEARN MORE...</u> —84l <br> <u>BUILD IT...</u> —84m |
| 84n | 2000 Focus <br> FORD'S PARTNERSHIP WITH RACING SPECIALIST COSWORTH RACING RESULTS IN THE NEW FOCUS, A LEADER IN SPACE, DYNAMICS AND COMFORT. | <u>LEARN MORE...</u> —84o <br> <u>BUILD IT...</u> —84p |
| 84q | 2000 Taurus <br> THE MID-LEVEL TAURUS PERFORMANCE SEDANS AND WAGONS WERE FORD'S BEST SELLLING CAR IN 1998. | <u>LEARN MORE...</u> —84r <br> <u>BUILD IT...</u> —84s |
| 84t | 2000 Winstar <br> THE WINSTAR, FORD'S ONLY MINIVAN, COMES EQUIPPED WITH FOUR SPEED AUTOMATIC TRANSMISSION AND SEVEN PASSENGER SEATING. | <u>LEARN MORE...</u> —84u <br> <u>BUILD IT...</u> —84v |

ARE WE MISSING A MODEL YOU'RE INTERESTED IN?
CLICK <u>HERE</u> TO TELL US WHAT YOU'D LIKE TO SEE.

<u>HOME</u> | <u>FAQS</u> | <u>CONTACT</u> | <u>PRESS</u> | <u>JOBS</u> | <u>TERMS</u>

*FIG. 9*

✉ QUESTIONS@CARORDER.COM ✆ 1.888.657.CARS (2277)

carOrder.com™  FIND MY CAR  BUILD MY CAR  FINANCIAL SERVICES  MY VIRTUAL GARAGE

 Browse: Learn More: 2000 Ford Contour  /85

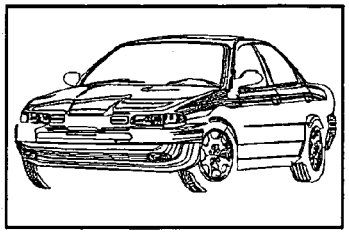

VEHICLE TYPE: 4-DOOR SEDAN
PERFORMANCE: 2.5L, 170HP V6, MANU W/AUTO
OPT. 2.5L, 200HP V6, MANU.
FEATURES: DUAL AIRBAGS, CHILD SAFETY LOCKS, ABS BRAKES (OPT. ON SPORT)
COMPARE TO: CHEVROLET MALIBU, HONDA CIVIC, PONTIAC GRAND AM  /85b  /85c

*Overview*  PERFORMANCE| FEATURES

85a { A SLIGHTLY UPDATED VERSION OF LAST YEAR'S CONTOUR, THE 2000 MODEL FEATURES A 2.5 LITER, 170HP V6 OR 2.5-LITER, 200HP V6 ENGINE WITH 5-SPEED MANUAL TRANSMISSION. ADVANCED SAFETY FEATURES OF THE CONTOUR INCLUDE DUAL AIRBAGS AND CHILD SAFETY LOCKS, AND ANTI-LOCK BRAKES ON THE SVT. A PASSIVE ANTI-THEFT SYSTEM COMES COMPLETE WITH A MULTI-FUNCTION REMOTE FOR ILLUMINATED KEYLESS ENTRY. AMENITIES INCLUDE A TILT STEERING COLUMN, AIR CONDITIONING, POWER WINDOWS AND DOOR LOCKS, AND AM/FM CASSETTE STEREO. A REAR SPOILER IS STANDARD ON THE SPORT, AND OPTIONAL ON THE SVT. A CD PLAYER AND POWER MOONROOF ARE AVAILABLE ON BOTH TRIMS.

/84a  /85d  /84d

 GOT A QUESTION? << ASK HERE  |Pick a new Make or Model|  |continue|Build this Car|

HOME | FAQS | CONTACT | PRESS | JOBS | TERMS

FIG. 10

✉ QUESTIONS@CARORDER.COM ✆ 1.888.657.CARS (2277)

carOrder.com™   FIND MY CAR   BUILD MY CAR   FINANCIAL SERVICES   MY VIRTUAL GARAGE

 Browse: Learn More: 2000 Ford Contour   ╱86

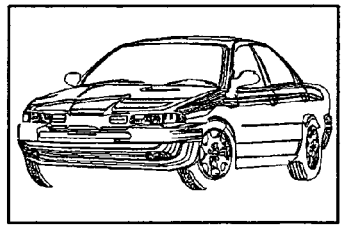

VEHICLE TYPE: 4-DOOR SEDAN
PERFORMANCE: 2.5L, 170HP V6, MANU W/AUTO
OPT. 2.5L, 200HP V6, MANU.
FEATURES: DUAL AIRBAGS, CHILD SAFETY LOCKS, ABS BRAKES (OPT. ON SPORT)
COMPARE TO: CHEVROLET MALIBU, HONDA CIVIC, PONTIAC GRAND AM ╱86b ╱85b

*Performance*                                    OVERVIEW | FEATURES

86a {
- SPORT: 2.5-LITER, 170 HP V6 ENGINE
- SVT: 2.5-LITER, 200HP V6 ENGINE
- 5-SPEED MANUAL OVERDRIVE
- SEQUENTIAL PORT FUELED INJECTION
- INDEPENDENT FRONT SUSPENSION
- POWER FRONT DISC/REAR DRUM BRAKES
- POWER RACK-AND-PINION STEERING
- ALUMINUM WHEELS
- SPORT: OPTIONAL 4-SPEED AUTOMATIC OVERDRIVE
- SVT: PERFORMANCE TIRES

 GOT A QUESTION? << ASK HERE | Pick a new Make or Model | continue | Build this Car

HOME | FAQS | CONTACT | PRESS | JOBS | TERMS

FIG. 11

| ✉ QUESTIONS@CARORDER.COM  ✆ 1.888.657.CARS (2277) |
|---|

Browse: Learn More: 2000 Ford Contour    ← 87

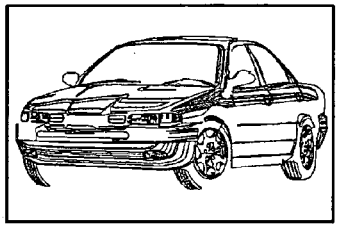

VEHICLE TYPE: 4-DOOR SEDAN
PERFORMANCE: 2.5L, 170HP V6, MANU W/AUTO
OPT. 2.5L, 200HP V6, MANU.
FEATURES: DUAL AIRBAGS, CHILD SAFETY LOCKS, ABS BRAKES (OPT. ON SPORT)
COMPARE TO: CHEVROLET MALIBU, HONDA CIVIC, PONTIAC GRAND AM  ╱─86b  ╱─85a

*Features*                                              OVERVIEW | FEATURES

- PASSIVE ANTI-THEFT SYSTEM
- FOG LIGHTS AND HALOGEN HEADLIGHTS
- REMOTE KEYLESS ENTRY SYSTEM
- SPORT BUCKET SEATS
- LEATHER STEERING WHEEL AND SHIFT KNOB
- STEERING WHEEL-MOUNTED CRUISE CONTROL
- AIR CONDITIONING
- AM/FM CASSETTE STEREO
- SPORT: REAR SPOILER
- SVT: 10-WAY POWER DRIVER'S SEAT

LIVE ✦ GOT A QUESTION?   | Pick a new Make or Model |   continue | Build this Car |
<<ASK HERE

HOME | FAQS | CONTACT | PRESS | JOBS | TERMS

FIG. 12

2000 INTREPID
FORD
2000 ESCORT
2000 EXPEDITION
2000 FOCUS
2000 WINDSTAR
2000 CROWN VICTORIA
2000 TAURUS
GMC
2000 YUKON
2000 ENVOY
HONDA
2000 CIVIC
HYUNDAI
2000 ELANTRA
2000 ACCENT
2000 SONATA
2000 TIBURON
INFINITI
2000 Q45
2000 QX4
JAGUAR
2000 S-TYPE
KIA
2000 SEPHIA
LEXUS
2000 GS 400
2000 LX 470
2000 GS 300
2000 ES 300
2000 RX 300
2000 LS 400
2000 SC 400
2000 SC 300
LINCOLN
2000 LS
2000 NAVIGATOR
MAZDA
2000 PROTEGE
2000 MPV
MERCEDES
2000 M-CLASS
2000 S-CLASS
2000 SLK-CLASS
2000 C-CLASS
MERCURY
2000 COUGAR
2000 MYSTIQUE
2000 SABLE
MITSUBISHI

*FIG. 13B*

2000 GALANT
2000 MIRAGE
2000 ECLIPSE
2000 DIAMANTE
NISSAN
2000 XTERRA
2000 ALTIMA
OLDSMOBILE
2000 BRAVADA
2000 INTRIGUE
PONTIAC
2000 BONNEVILLE
2000 GRAND AM
SUZUKI
2000 SWIFT
TOYOTA
2000 COROLLA
2000 CELICA
2000 AVALON
VOLKSWAGEN
2000 PASSAT
2000 EUROVAN
2000 GOLF
2000 GTI
2000 JETTA
2000 NEW BEETLE
VOLVO
2000 S40
2000 S80
2000 V40
2000 S70

ARE WE MISSING A *MODEL* YOU'RE INTERESTED IN?
CLICK *HERE* TO TELL US WHAT YOU'D LIKE TO SEE.

*HOME* | *FAQS* | *CONTACT* | *PRESS* | *JOBS* | *TERMS*

FIG. 13C

QUESTIONS@CARORDER.COM  1.888.657.CARS (2277)

carOrder.com™   FIND MY CAR   BUILD MY CAR   FINANCIAL SERVICES   MY VIRTUAL GARAGE

Find My Car: Search By Feature

USE THE MENUS BELOW TO IDENTIFY VEHICLES OFFERED WITH THE FEATURES YOU'D LIKE:

| $ PRICE RANGE | SELECT A BODY STYLE: | | 92 vehicles found: |
|---|---|---|---|
| VEHICLE TYPE | ☐ SEDAN — 93b | ☐ WAGON — 93c | ACURA<br>2000 RL<br>2000 TL |
| ENGINE | ☐ COUPE — 93d | ☐ CONVERTIBLE — 93e | AUDI<br>2000 A6<br>2000 S4<br>2000 TT<br>2000 A4 |
| FUEL ECONOMY | ☐ PICKUP — 93f | ☐ SPORT UTILITY — 93g | BMW<br>2000 Z3<br>2000 3 SERIES<br>2000 5 SERIES |
| INTERIOR | SELECT LAYOUT: | | BUICK<br>2000 REGAL |
| SAFETY | ☐ FRONT ENGINE — 93h | ☐ MID ENGINE — 93i | CADILLAC<br>2000 DE VILLE<br>2000 ESCALADE<br>2000 SEVILLE |
| | ☐ REAR ENGINE — 93j | | CHEVROLET<br>2000 TRACKER<br>2000 IMPALA<br>2000 METRO<br>2000 LUMINA<br>2000 MONTE CARLO<br>2000 MALIBU<br>2000 TAHOE<br>2000 CORVETTE<br>2000 PRIZM |
| | SELECT DRIVETRAIN TYPE: | | |
| | ☐ FRONT WHEEL DRIVE — 93k | ☐ REAR WHEEL DRIVE — 93l | |
| | ☐ ALL WHEEL DRIVE — 93m | ☐ FOUR WHEEL DRIVE — 93n | CHRYSLER<br>2000 CONCORDE<br>2000 CIRRUS<br>2000 300M<br>2000 LHS |
| | 93a | | DAEWOO<br>2000 NUBIRA<br>2000 LEGANZA<br>2000 LANOS |
| | | | DODGE<br>2000 AVENGER<br>2000 NEON |

FIG. 14A

2000 INTREPID
FORD
2000 ESCORT
2000 EXPEDITION
2000 FOCUS
2000 WINDSTAR
2000 CROWN VICTORIA
2000 TAURUS
GMC
2000 YUKON
2000 ENVOY
HONDA
2000 CIVIC
HYUNDAI
2000 ELANTRA
2000 ACCENT
2000 SONATA
2000 TIBURON
INFINITI
2000 Q45
2000 QX4
JAGUAR
2000 S-TYPE
KIA
2000 SEPHIA
LEXUS
2000 GS 400
2000 LX 470
2000 GS 300
2000 ES 300
2000 RX 300
2000 LS 400
2000 SC 400
2000 SC 300
LINCOLN
2000 LS
2000 NAVIGATOR
MAZDA
2000 PROTEGE
2000 MPV
MERCEDES
2000 M-CLASS
2000 S-CLASS
2000 SLK-CLASS
2000 C-CLASS
MERCURY
2000 COUGAR
2000 MYSTIQUE
2000 SABLE
MITSUBISHI

FIG. 14B

2000 GALANT
2000 MIRAGE
2000 ECLIPSE
2000 DIAMANTE
NISSAN
2000 XTERRA
2000 ALTIMA
OLDSMOBILE
2000 BRAVADA
2000 INTRIGUE
PONTIAC
2000 BONNEVILLE
2000 GRAND AM
SUZUKI
2000 SWIFT
TOYOTA
2000 COROLLA
2000 CELICA
2000 AVALON
VOLKSWAGEN
2000 PASSAT
2000 EUROVAN
2000 GOLF
2000 GTI
2000 JETTA
2000 NEW BEETLE
VOLVO
2000 S40
2000 S80
2000 V40
2000 S70

ARE WE MISSING A MODEL YOU'RE INTERESTED IN?
CLICK HERE TO TELL US WHAT YOU'D LIKE TO SEE.

HOME | FAQS | CONTACT | PRESS | JOBS | TERMS

2000 INTREPID
FORD
2000 ESCORT
2000 EXPEDITION
2000 FOCUS
2000 WINDSTAR
2000 CROWN VICTORIA
2000 TAURUS
GMC
2000 YUKON
2000 ENVOY
HONDA
2000 CIVIC
HYUNDAI
2000 ELANTRA
2000 ACCENT
2000 SONATA
2000 TIBURON
INFINITI
2000 Q45
2000 QX4
JAGUAR
2000 S-TYPE
KIA
2000 SEPHIA
LEXUS
2000 GS 400
2000 LX 470
2000 GS 300
2000 ES 300
2000 RX 300
2000 LS 400
2000 SC 400
2000 SC 300
LINCOLN
2000 LS
2000 NAVIGATOR
MAZDA
2000 PROTEGE
2000 MPV
MERCEDES
2000 M-CLASS
2000 S-CLASS
2000 SLK-CLASS
2000 C-CLASS
MERCURY
2000 COUGAR
2000 MYSTIQUE
2000 SABLE
MITSUBISHI

*FIG. 15B*

2000 GALANT
2000 MIRAGE
2000 ECLIPSE
2000 DIAMANTE
NISSAN
2000 XTERRA
2000 ALTIMA
OLDSMOBILE
2000 BRAVADA
2000 INTRIGUE
PONTIAC
2000 BONNEVILLE
2000 GRAND AM
SUZUKI
2000 SWIFT
TOYOTA
2000 COROLLA
2000 CELICA
2000 AVALON
VOLKSWAGEN
2000 PASSAT
2000 EUROVAN
2000 GOLF
2000 GTI
2000 JETTA
2000 NEW BEETLE
VOLVO
2000 S40
2000 S80
2000 V40
2000 S70

ARE WE MISSING A MODEL YOU'RE INTERESTED IN?
CLICK HERE TO TELL US WHAT YOU'D LIKE TO SEE.

HOME | FAQS | CONTACT | PRESS | JOBS | TERMS

FIG. 15C

Find My Car: Search By Feature

USE THE MENUS BELOW TO IDENTIFY VEHICLES OFFERED WITH THE FEATURES YOU'D LIKE:

| | | SELECT A HIGHWAY FUEL ECONOMY RANGE FOR: | 92 vehicles found: |
|---|---|---|---|
| $ | PRICE RANGE | ☐ LESS THAN 20 MPG — 95b  ☐ 21 MPG TO 25 MPG — 95c | ACURA<br>2000 RL<br>2000 TL |
| 🚗 | VEHICLE TYPE | ☐ 26 MPG TO 30 MPG — 95d  ☐ MORE THAN 31 MPG — 95e | AUDI<br>2000 A6<br>2000 S4 |
| ⚙ | ENGINE | SELECT A CITY FUEL ECONOMY RANGE FOR YOUR VEHICLE: | 2000 TT<br>2000 A4 |
| ⛽ | FUEL ECONOMY | ☐ LESS THAN 10 MPG — 95f  ☐ 11 MPG TO 15 MPG — 95g | BMW<br>2000 Z3<br>2000 3 SERIES<br>2000 5 SERIES |
| 🪑 | INTERIOR | ☐ 16 MPG TO 20 MPG — 95h  ☐ MORE THAN 21 MPG — 95i | BUICK<br>2000 REGAL |
| 🛡 | SAFETY | | CADILLAC<br>2000 DE VILLE<br>2000 ESCALADE<br>2000 SEVILLE |

{ 95a }

CHEVROLET
2000 TRACKER
2000 IMPALA
2000 METRO
2000 LUMINA
2000 MONTE CARLO
2000 MALIBU
2000 TAHOE
2000 CORVETTE
2000 PRIZM
CHRYSLER
2000 CONCORDE
2000 CIRRUS
2000 300M
2000 LHS
DAEWOO
2000 NUBIRA
2000 LEGANZA
2000 LANOS
DODGE
2000 AVENGER
2000 NEON

FIG. 16A

*2000 INTREPID*
*FORD*
*2000 ESCORT*
*2000 EXPEDITION*
*2000 FOCUS*
*2000 WINDSTAR*
*2000 CROWN VICTORIA*
*2000 TAURUS*
*GMC*
*2000 YUKON*
*2000 ENVOY*
*HONDA*
*2000 CIVIC*
*HYUNDAI*
*2000 ELANTRA*
*2000 ACCENT*
*2000 SONATA*
*2000 TIBURON*
*INFINITI*
*2000 Q45*
*2000 QX4*
*JAGUAR*
*2000 S-TYPE*
*KIA*
*2000 SEPHIA*
*LEXUS*
*2000 GS 400*
*2000 LX 470*
*2000 GS 300*
*2000 ES 300*
*2000 RX 300*
*2000 LS 400*
*2000 SC 400*
*2000 SC 300*
*LINCOLN*
*2000 LS*
*2000 NAVIGATOR*
*MAZDA*
*2000 PROTEGE*
*2000 MPV*
*MERCEDES*
*2000 M-CLASS*
*2000 S-CLASS*
*2000 SLK-CLASS*
*2000 C-CLASS*
*MERCURY*
*2000 COUGAR*
*2000 MYSTIQUE*
*2000 SABLE*
*MITSUBISHI*

*FIG. 16B*

2000 GALANT
2000 MIRAGE
2000 ECLIPSE
2000 DIAMANTE
NISSAN
2000 XTERRA
2000 ALTIMA
OLDSMOBILE
2000 BRAVADA
2000 INTRIGUE
PONTIAC
2000 BONNEVILLE
2000 GRAND AM
SUZUKI
2000 SWIFT
TOYOTA
2000 COROLLA
2000 CELICA
2000 AVALON
VOLKSWAGEN
2000 PASSAT
2000 EUROVAN
2000 GOLF
2000 GTI
2000 JETTA
2000 NEW BEETLE
VOLVO
2000 S40
2000 S80
2000 V40
2000 S70

ARE WE MISSING A *MODEL* YOU'RE INTERESTED IN?
CLICK *HERE* TO TELL US WHAT YOU'D LIKE TO SEE.

HOME | *FAQS* | *CONTACT* | *PRESS* | *JOBS* | *TERMS*

FIG. 16C

2000 INTREPID
FORD
2000 ESCORT
2000 EXPEDITION
2000 FOCUS
2000 WINDSTAR
2000 CROWN VICTORIA
2000 TAURUS
GMC
2000 YUKON
2000 ENVOY
HONDA
2000 CIVIC
HYUNDAI
2000 ELANTRA
2000 ACCENT
2000 SONATA
2000 TIBURON
INFINITI
2000 Q45
2000 QX4
JAGUAR
2000 S-TYPE
KIA
2000 SEPHIA
LEXUS
2000 GS 400
2000 LX 470
2000 GS 300
2000 ES 300
2000 RX 300
2000 LS 400
2000 SC 400
2000 SC 300
LINCOLN
2000 LS
2000 NAVIGATOR
MAZDA
2000 PROTEGE
2000 MPV
MERCEDES
2000 M-CLASS
2000 S-CLASS
2000 SLK-CLASS
2000 C-CLASS
MERCURY
2000 COUGAR
2000 MYSTIQUE
2000 SABLE
MITSUBISHI

*FIG. 17B*

2000 GALANT
2000 MIRAGE
2000 ECLIPSE
2000 DIAMANTE
NISSAN
2000 XTERRA
2000 ALTIMA
OLDSMOBILE
2000 BRAVADA
2000 INTRIGUE
PONTIAC
2000 BONNEVILLE
2000 GRAND AM
SUZUKI
2000 SWIFT
TOYOTA
2000 COROLLA
2000 CELICA
2000 AVALON
VOLKSWAGEN
2000 PASSAT
2000 EUROVAN
2000 GOLF
2000 GTI
2000 JETTA
2000 NEW BEETLE
VOLVO
2000 S40
2000 S80
2000 V40
2000 S70

ARE WE MISSING A *MODEL* YOU'RE INTERESTED IN?
CLICK *HERE* TO TELL US WHAT YOU'D LIKE TO SEE.

HOME | *FAQS* | *CONTACT* | *PRESS* | *JOBS* | *TERMS*

FIG. 17C

✉ QUESTIONS@CARORDER.COM  ✆ 1.888.657.CARS (2277)

carOrder.com™  FIND MY CAR   BUILD MY CAR   FINANCIAL SERVICES   MY VIRTUAL GARAGE

Find My Car: Search By Feature

USE THE MENUS BELOW TO IDENTIFY VEHICLES OFFERED WITH THE FEATURES YOU'D LIKE:

| $ PRICE RANGE | SELECT SAFETY FEATURES BY YOUR VEHICLE: | 92 vehicles found: |
|---|---|---|
| VEHICLE TYPE | ☐ DRIVER SIDE AIRBAG — 97b  ☐ PASSENGER SIDE AIRBAG — 97c | ACURA<br>2000 RL<br>2000 TL |
| ENGINE | ☐ SIDE IMPACT AIRBAG — 97d  ☐ SEAT BELT PRETENSIONERS — 97e | AUDI<br>2000 A6<br>2000 S4<br>2000 TT<br>2000 A4 |
| FUEL ECONOMY | ☐ SIDE INTRUSION PROTECTION — 97f  ☐ ROADSIDE ASSISTANCE — 97g | BMW<br>2000 Z3<br>2000 3 SERIES<br>2000 5 SERIES |
| INTERIOR | ☐ INTEGRATED CHILD SAFETY SEAT — 97h | BUICK<br>2000 REGAL |
| SAFETY | | CADILLAC<br>2000 DE VILLE<br>2000 ESCALADE<br>2000 SEVILLE |

CHEVROLET
2000 TRACKER
2000 IMPALA
2000 METRO
2000 LUMINA
2000 MONTE CARLO
2000 MALIBU
2000 TAHOE
2000 CORVETTE
2000 PRIZM
CHRYSLER
2000 CONCORDE
2000 CIRRUS
2000 300M
2000 LHS
DAEWOO
2000 NUBIRA
2000 LEGANZA
2000 LANOS
DODGE
2000 AVENGER
2000 NEON

2000 INTREPID
FORD
2000 ESCORT
2000 EXPEDITION
2000 FOCUS
2000 WINDSTAR
2000 CROWN VICTORIA
2000 TAURUS
GMC
2000 YUKON
2000 ENVOY
HONDA
2000 CIVIC
HYUNDAI
2000 ELANTRA
2000 ACCENT
2000 SONATA
2000 TIBURON
INFINITI
2000 Q45
2000 QX4
JAGUAR
2000 S-TYPE
KIA
2000 SEPHIA
LEXUS
2000 GS 400
2000 LX 470
2000 GS 300
2000 ES 300
2000 RX 300
2000 LS 400
2000 SC 400
2000 SC 300
LINCOLN
2000 LS
2000 NAVIGATOR
MAZDA
2000 PROTEGE
2000 MPV
MERCEDES
2000 M-CLASS
2000 S-CLASS
2000 SLK-CLASS
2000 C-CLASS
MERCURY
2000 COUGAR
2000 MYSTIQUE
2000 SABLE
MITSUBISHI

*FIG. 18B*

2000 GALANT
2000 MIRAGE
2000 ECLIPSE
2000 DIAMANTE
NISSAN
2000 XTERRA
2000 ALTIMA
OLDSMOBILE
2000 BRAVADA
2000 INTRIGUE
PONTIAC
2000 BONNEVILLE
2000 GRAND AM
SUZUKI
2000 SWIFT
TOYOTA
2000 COROLLA
2000 CELICA
2000 AVALON
VOLKSWAGEN
2000 PASSAT
2000 EUROVAN
2000 GOLF
2000 GTI
2000 JETTA
2000 NEW BEETLE
VOLVO
2000 S40
2000 S80
2000 V40
2000 S70

ARE WE MISSING A MODEL YOU'RE INTERESTED IN?
CLICK *HERE* TO TELL US WHAT YOU'D LIKE TO SEE.

HOME | FAQS | CONTACT | PRESS | JOBS | TERMS

FIG. 18C

✉ QUESTIONS@CARORDER.COM  ✆ 1.888.657.CARS (2277)

HOW IT WORKS | ABOUT US | PRIVACY POLICY carOrder.com™  FIND MY CAR   BUILD MY CAR   FINANCIAL SERVICES   MY VIRTUAL GARAGE

Find My Vehicle: Compare Vehicles

PLEASE SELECT TWO CARS FOR COMPARISON. CHOOSE FROM BASE MODELS OR SAVED MODELS FROM YOUR VIRTUAL GARAGE.®

Vehicle One
DO YOU WANT TO COMPARE A BASE MODEL OR A SAVED CAR?

⦿ BASE MODEL.  ○ SAVED MODEL FROM MY VIRTUAL GARAGE.®
~100g      100h~ (YOU MUST BE LOGGED IN & HAVE CARS SAVED IN YOUR VIRTUAL GARAGE® TO USE THIS FEATURE.)

PLEASE SELECT A MANUFACTURER, MODEL, AND TRIMLINE:

| SELECT MAKE ▽ | SELECT MODEL ▽ | SELECT TRIM ▽ |
|---|---|---|
| 100a | 101a  100b | 100c |

HOW WOULD YOU LIKE THIS VEHICLE EQUIPPED?

⦿ BASIC EQUIPMENT    ○ WELL EQUIPPED    ○ LOADED
~100i           100j~           100k~

Vehicle Two
DO YOU WANT TO COMPARE A BASE MODEL OR A SAVED CAR?

⦿ BASE MODEL.  ○ SAVED MODEL FROM MY VIRTUAL GARAGE.®
~100l      100m~ (YOU MUST BE LOGGED IN & HAVE CARS SAVED IN YOUR VIRTUAL GARAGE® TO USE THIS FEATURE.)

PLEASE SELECT A MANUFACTURER, MODEL, AND TRIMLINE:

| SELECT MAKE ▽ | SELECT MODEL ▽ | SELECT TRIM ▽ |
|---|---|---|
| 100d | 100e | 100f |

HOW WOULD YOU LIKE THIS VEHICLE EQUIPPED?

⦿ BASIC EQUIPMENT    ○ WELL EQUIPPED    ○ LOADED
~100n           100o~           100p~

ARE WE MISSING A MODEL YOU'RE INTERESTED IN?
CLICK HERE TO TELL US WHAT YOU'D LIKE TO SEE.

HOME | FAQS | CONTACT | PRESS | JOBS | TERMS

FIG. 19

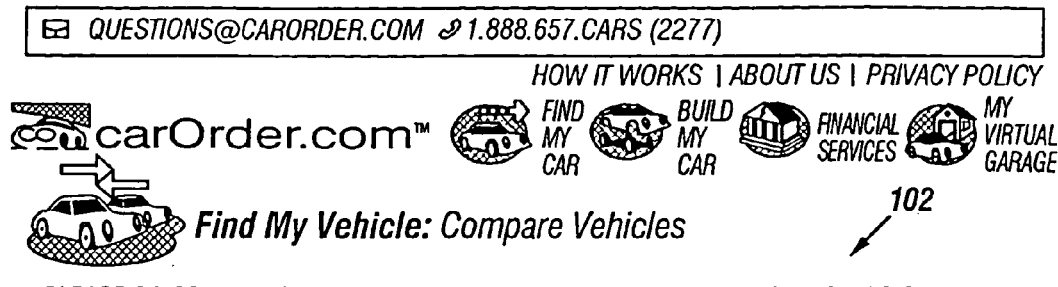

QUESTIONS@CARORDER.COM ✆ 1.888.657.CARS (2277)

HOW IT WORKS | ABOUT US | PRIVACY POLICY carOrder.com™ — FIND MY CAR — BUILD MY CAR — FINANCIAL SERVICES — MY VIRTUAL GARAGE

Find My Vehicle: Compare Vehicles        /102

PLEASE SELECT TWO CARS FOR COMPARISON. CHOOSE FROM BASE MODELS OR SAVED MODELS FROM YOUR VIRTUAL GARAGE.®

Vehicle One
DO YOU WANT TO COMPARE A BASE MODEL OR A SAVED CAR?
○ BASE MODEL.        ● SAVED MODEL FROM MY VIRTUAL GARAGE.®
(YOU MUST BE LOGGED IN & HAVE CARS SAVED IN YOUR VIRTUAL GARAGE® TO USE THIS FEATURE.)

PLEASE SELECT A SAVED CAR FROM YOUR VIRTUAL GARAGE®:

[ SELECT GARAGE CAR ▽ ]⟵101b
   ⟵100q

HOW WOULD YOU LIKE THIS VEHICLE EQUIPPED?
○ BASIC EQUIPMENT        ○ WELL EQUIPPED        ○ LOADED

Vehicle Two
DO YOU WANT TO COMPARE A BASE MODEL OR A SAVED CAR?
● BASE MODEL.        ○ SAVED MODEL FROM MY VIRTUAL GARAGE.®
(YOU MUST BE LOGGED IN & HAVE CARS SAVED IN YOUR VIRTUAL GARAGE® TO USE THIS FEATURE.)

PLEASE SELECT A MANUFACTURER, MODEL, AND TRIMLINE:

[ SELECT MAKE ▽ ]   [ SELECT MODEL ▽ ]   [ SELECT TRIM ▽ ]

HOW WOULD YOU LIKE THIS VEHICLE EQUIPPED?
○ BASIC EQUIPMENT        ○ WELL EQUIPPED        ○ LOADED

*ARE WE MISSING A MODEL YOU'RE INTERESTED IN?*
*CLICK HERE TO TELL US WHAT YOU'D LIKE TO SEE.*

HOME | FAQS | CONTACT | PRESS | JOBS | TERMS

✉ QUESTIONS@CARORDER.COM ✆ 1.888.657.CARS (2277)

HOW IT WORKS | ABOUT US | PRIVACY POLICY

 Find My Vehicle: *Compare Vehicles*

*PLEASE SELECT TWO CARS FOR COMPARISON. CHOOSE FROM BASE MODELS OR SAVED MODELS FROM YOUR VIRTUAL GARAGE.®*

Vehicle One

DO YOU WANT TO COMPARE A BASE MODEL OR A SAVED CAR?

⦿ BASE MODEL.   ○ SAVED MODEL FROM MY VIRTUAL GARAGE.®
(YOU MUST BE <u>LOGGED IN</u> & HAVE CARS SAVED IN YOUR VIRTUAL GARAGE® TO USE THIS FEATURE.)

PLEASE SELECT A MANUFACTURER, MODEL, AND TRIMLINE:

| FORD ▽ | 2000 CONTOUR ▽ | SVT SEDAN ▽ |

HOW WOULD YOU LIKE THIS VEHICLE EQUIPPED?

⦿ BASIC EQUIPMENT   ○ WELL EQUIPPED   ○ LOADED

Vehicle Two

DO YOU WANT TO COMPARE A BASE MODEL OR A SAVED CAR?

⦿ BASE MODEL.   ○ SAVED MODEL FROM MY VIRTUAL GARAGE.®
(YOU MUST BE <u>LOGGED IN</u> & HAVE CARS SAVED IN YOUR VIRTUAL GARAGE® TO USE THIS FEATURE.)

PLEASE SELECT A MANUFACTURER, MODEL, AND TRIMLINE:

| CHEVROLET ▽ | 2000 LUMINA ▽ | BASE SEDAN ▽ |

HOW WOULD YOU LIKE THIS VEHICLE EQUIPPED?

⦿ BASIC EQUIPMENT   ○ WELL EQUIPPED   ○ LOADED

*100r*
<u>COMPARE...</u>

*ARE WE MISSING A MODEL YOU'RE INTERESTED IN?
CLICK <u>HERE</u> TO TELL US WHAT YOU'D LIKE TO SEE.*

<u>HOME</u> | <u>FAQS</u> | <u>CONTACT</u> | <u>PRESS</u> | <u>JOBS</u> | <u>TERMS</u>

FIG. 21

| | | | |
|---|---|---|---|
| AM/FM STEREO: | N/A | AM/FM STEREO: | CASSETTE |
| CASSETTE: | N/A | CASSETTE: | YES |
| IN-DASH CD: | N/A | IN-DASH CD: | NO |
| CD CHANGER: | N/A | CD CHANGER: | NO |
| CELLULAR PHONE: | N/A | CELLULAR PHONE: | N/A |
| TRIP COMPUTER: | N/A | TRIP COMPUTER: | N/A |
| SUNROOF/MOONROOF: | N/A | SUNROOF/MOONROOF: | N/A |
| SAFETY | | SAFETY | |
| SIDE IMPACT AIR BAGS: | N/A | SIDE IMPACT AIR BAGS: | N/A |
| DRIVER SIDE AIR BAG: | N/A | DRIVER SIDE AIR BAG: | STANDARD |
| PASSENGER SIDE AIR BAG: | N/A | PASSENGER SIDE AIR BAG: | STANDARD |
| SEAT BELT PRETENSIONERS: | N/A | SEAT BELT PRETENSIONERS: | N/A |
| ROADSIDE ASSISTANCE: | N/A | ROADSIDE ASSISTANCE: | STANDARD |
| INTEGRATED CHILD SEATS: | N/A | INTEGRATED CHILD SEATS: | N/A |
| SECURITY | | SECURITY | |
| ANTITHEFT SYSTEM: | N/A | ANTITHEFT SYSTEM: | N/A |
| BRAKES | | BRAKES | |
| DISC BRAKES: | N/A | DISC BRAKES: | STANDARD |
| NUMBER OF DISC BRAKES: | N/A | NUMBER OF DISC BRAKES: | 2 |
| ABS: | N/A | ABS: | N/A |
| ABS LOCATION: | N/A | ABS LOCATION: | N/A |
| CHASSIS | | CHASSIS | |
| RIM TYPE: | N/A | RIM TYPE: | STEEL |
| RIM DIAMETER: | N/A | RIM DIAMETER: | 15 |
| RIM WIDTH: | N/A | RIM WIDTH: | 6.0 |
| TIRE RATING: | N/A | TIRE RATING: | S |
| DIMENSIONS | | DIMENSIONS | |
| OVERALL LENGTH (CM): | N/A | OVERALL LENGTH (CM): | 5103 |
| OVERALL WIDTH (CM): | N/A | OVERALL WIDTH (CM): | 1842 |
| OVERALL HEIGHT (CM): | N/A | OVERALL HEIGHT (CM): | 1402 |
| WHEELBASE (CM): | N/A | WHEELBASE (CM): | 2731 |
| FRONT TRACK (CM): | N/A | FRONT TRACK (CM): | 1511 |
| REAR TRACK (CM): | N/A | REAR TRACK (CM): | 1499 |
| FRONT HEADROOM: | N/A | FRONT HEADROOM: | 975 |
| REAR HEADROOM: | N/A | REAR HEADROOM: | 950 |
| FRONT LEG ROOM: | N/A | FRONT LEG ROOM: | 1077 |
| REAR LEG ROOM: | N/A | REAR LEG ROOM: | 930 |
| INTERIOR VOLUME (CM3): | N/A | INTERIOR VOLUME (CM3): | 2846 |
| FUEL | | FUEL | |

FIG. 22B

| | | | |
|---|---|---|---|
| HIGHWAY EPA: | N/A | HIGHWAY EPA: | N/A |
| CITY EPA: | N/A | CITY EPA: | N/A |
| TANK CAPACITY (L): | N/A | TANK CAPACITY (L): | 63 |
| RECOMMENDED FUEL: | N/A | RECOMMENDED FUEL: | UNLEADED |

PAINT　　　　　　　　　　　　PAINT

| | | | |
|---|---|---|---|
| PAINT TYPE: | N/A | PAINT TYPE: | N/A |
| MULTICOAT PAINT: | N/A | MULTICOAT PAINT: | N/A |
| TWOTONE PAINT: | N/A | TWOTONE PAINT: | N/A |

COMPARE...　　　　　　　COMPARE...
105f　　　　　　　　　　　　105g

ARE WE MISSING A MODEL YOU'RE INTERESTED IN?
CLICK HERE TO TELL US WHAT YOU'D LIKE TO SEE.

HOME | FAQS | CONTACT | PRESS | JOBS | TERMS

FIG. 22C

✉ QUESTIONS@CARORDER.COM ☎ 1.888.657.CARS (2277)

HOW IT WORKS | ABOUT US | PRIVACY POLICY carOrder.com™  FIND MY CAR   BUILD MY CAR   FINANCIAL SERVICES   MY VIRTUAL GARAGE Custom-Build My Car: Vehicle Selection  /110

<<< BACK TO FIND MY CAR

USE THE MENUS BELOW TO SPECIFY YOUR CAR, NEXT YOU'LL CONFIGURE IT

Your Car

MANUFACTURER: [SELECT MAKE ▽] /110a

MODEL: [SELECT MODEL ▽] /110b

TRIMLINME/STYLE: [SELECT TRIM ▽] /110c

/110d
RESEARCH HERE

HOME | FAQS | CONTACT | PRESS | JOBS | TERMS

FIG. 25

SYSTEM AND METHOD FOR FACILITATING COMMERCIAL TRANSACTIONS OVER A DATA NETWORK

CROSS-REFERENCE TO RELATED APPLICATIONS

This application claims priority from Provisional Patent Application No. 60/176,117, entitled "System And Method For Facilitating Commercial Transactions Over A Data Network," filed Jan. 14, 2000, and having Joshua Walsky as inventor. This application is assigned to Trilogy Development Group, Inc., the assignee of the present invention, and is hereby incorporated by reference.

BACKGROUND OF THE INVENTION

1. Field of the Invention

The present invention relates to communication over a data network. Specifically, the present invention is directed to facilitating commercial transactions over a wide area data network.

2. Description of the Related Art

Historically, product-related information, such as a description of the nature of a product, price of the product, warranties covering a product, customer service associated with a product, and the like, was disseminated using various types of media. The media chosen was typically independent of the mode in which the actual transaction concerning the product was to occur. Rather, the media was chosen based upon the anticipated market for the product. For example, advertisements for mining tools would typically be found in a trade journal, as opposed to be displayed on television. However, the popularity of commercial transactions over wide area data networks, such as the Internet, has caused companies to disseminate product-related information through the same media through which the transactions concerning the products occur. As a result, companies are investing enormous amounts of time, money and effort to provide product-related information over the Internet.

Companies have been assisted in the endeavor to provide product-related information over wide area networks by the technology available on the Internet. The Internet typically includes a number of users employing client terminals communicating with a remote server computer to transfer information therebetween. To facilitate the transfer, the client terminals have a "web" browser that provides graphical user interface (GUI)-based communication with a "web page" obtained from a server. One popular collection of servers uses a standardized Hypertext Transfer Protocol (HTTP) to provide information and is known as the "World Wide Web." The information is typically presented as web pages written as text with standardized formatting and control symbols known as Hypertext Mark-up Language (HTML). HTML provides basic document formatting and allows a server to specify "links" to other servers and files. Use of an HTML-compliant browser involves specification of a link via a Uniform Resource Locator (URL). Upon such specification, the user's client terminal makes a TCP/IP request to the server identified in the link and receives an HTML file that is interpreted by the browser so that a electronic HTML document made up of one or more web pages may be displayed on the client's terminal.

One difficulty with commercial transactions over the Internet concerns shopping for items based on price (i.e., comparison-price shopping). Comparison-price shopping involves a user comparing prices for similar products to determine which the user desires. There are major factors endemic to the Internet that frustrate comparison-price shopping. First, the quantity of information frustrates the identification of a single product, much less multiple products having similar or analogous characteristics. A second difficulty is that the accuracy of the information on the Internet is often compromised by various conditions, such as the rapidity with which product-related information changes and the difficulty with updating large amounts of product-related information on the Internet. In addition, the accuracy of product-related information may be supplier-dependent. If a substitute supplier of a product is used, certain characteristics of product-related information may change (e.g., price).

With respect to finding information concerning specific products, the area is replete with attempts to augment the probability that the product-related information will be perceived by a user. For example, U.S. Pat. No. 5,937,390 to Hyodo discloses a method for determining the effectiveness of advertisements accessed over the Internet using a WWW browser. When accessing an advertisement, the user receives a toll-free telephone number of a store and calls the toll-free telephone number. A toll-free call control system connects the call to a store in which the desired product in available to determine whether the user would like to buy the advertised product. At the same time, information concerning the access is recorded as log information. This log information is posted to the service provider, and the service provider analyzes the hit rate from this log information and the WWW browser access log. From this result, the on-line service provider, or advertiser, can determine the effectiveness: of the given advertisement. However, a user cannot complete the transaction concerning the purchasing of the product entirely over the Internet, thereby requiring additional retail infrastructure.

U.S. Pat. No. 5,918,214 to Perkowski discloses a system and method for finding product and service related information the Internet. The system includes Internet Servers that contain information pertaining to Universal Product or Service Number (e.g., UPC number) preassigned to each product and service registered in the system, with Uniform Resource Locators (URLs) that point to the location of one or more information resources on the Internet (e.g., World Wide Web (WWW) websites). A user is provided with an "Internet Product/Service Information (IPSI) Finder" feature and a "Universal Product/Service Number (UPSN) Search" feature. The system enters its "IPSI Finder Mode" when the "IPSI Finder" feature is activated enters the "UPSN Search Mode" when the "UPSN Search" feature is activated. When the system is in its IPSI Finder Mode, a predesignated information resource (e.g., advertisement, product information, etc.) pertaining to any commercial product or service registered with the system is automatically accessed from the Internet and displayed from the Internet browser by simply entering the registered product's UPN or the registered service's USN into the Internet browser. When the system is in its "UPSN Search Mode", a predesignated information resource pertaining to any commercial product or service registered with the system is automatically accessed from the Internet and displayed from the Internet browser by simply entering the registered product's trademark(s) or (service mark) and/or associated company name into the Internet browser.

U.S. Pat. No. 5,745,681 to Levine, et al., discloses an invention for maintaining a record of items selected for purchase from a group of selectable items. The invention includes a browser at a client station having a request module to send a shopping page request to a server. A shopping page module in the server sends a shopping page file to the browser in response to the shopping page request. The shopping page file contains items selectable by a user using the browser. A shopping module at the browser generates an add request and sends the add request to the server. This add request contains selected items from the items that were selectable in the shopping page file. A receiver at the server receives the add request from the browser, and a cart list module at the server initializes a shopping cart list. An add module at the server adds the selected items to the shopping cart list. A shopping page module at the server converts the cart list to a cart field, generates a new shopping page file, embeds the cart field in the new shopping page file and sends the new shopping page file to the browser. In this way, the shopping cart field is in a shopping page file that may be managed by the browser at the client station.

While both Perkowski and Levine, et al., facilitate identification of products that a user is interested in purchasing, neither Perkowski nor Levine, et al., ensure the accuracy of the product-related information provided. What is needed, therefore, is a technique for easily identifying multiple products of similar characteristics that ensures the information corresponding to the products is accurate.

SUMMARY OF THE INVENTION

In one embodiment of the present invention, a method, a computer system and a computer program product to facilitate comparison-price shopping over a data network, such as the Internet, are provided that includes a price availability feature guaranteeing a price of a product associated with product-related information stored on a server. The information typically includes offered price data. A server is provided that includes a number of addresses in an address space, and a subportion of those addresses is associated with an identification code. Acceptance of the offered price data is achieved by storing the information in the subportion, defining an agreed price data. The agreed price data is maintained in the absence of a predetermined system event. In one embodiment, the predetermined system event may include an expiration of a preset amount of time. Alternatively, the predetermined system event may include dissociating information from the subportion of the addresses. Although the product-related information may correspond to any known product, the present invention is discussed with respect to product-related information regarding automobiles.

In another embodiment of the present invention, a method for managing information regarding a product is disclosed. The method includes selecting a selected feature from a number of such features and storing the information. The product can be configured with at least one of the features. The information includes the selected feature.

These and other embodiments of the present invention, along with many of its advantages and features, are described in more detail below and are shown in the attached drawings. The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 3 is a plan view of a first web page having a visual representation of a hypertext link which can be employed in accessing a Virtual Garage™;

FIG. 4 is a plan view of a second web page having a visual representation of a hypertext link and data entry regions which can be employed in accessing a Virtual Garage™;

FIGS. 5a–b is a plan view of a web page employed to allow users to register to gain access to a Virtual Garage™;

FIG. 7 is a plan view of a first web page through which a user can access product-related information that may be associated with the web page shown above in FIG. 6;

FIG. 8 is a plan view of a second web page through which a user can access product-related information that may be associated with the web page shown above in FIG. 6;

FIG. 9 is a plan view of a third web page through which a user can access product-related information that may be associated with the web page shown above in FIG. 6;

FIG. 10 is a plan view of a fourth web page through which a user can access product-related information that may be associated with the web page shown above in FIG. 6;

FIG. 11 is a plan view of a fifth page through which a user can access product-related information that may be associated with the web page shown above in FIG. 6;

FIG. 12 is a plan view of a sixth web page through which a user can access product-related information that may be associated with the web page shown above in FIG. 6;

FIGS. 13a–c are plan views of a seventh web page through which a user can access product-related information that may be associated with the web page shown above in FIG. 6;

FIGS. 14a–c are plan views of a eight web page through which a user can access product-related information that may be associated with the web page shown above in FIG. 6;

Figure 15A:
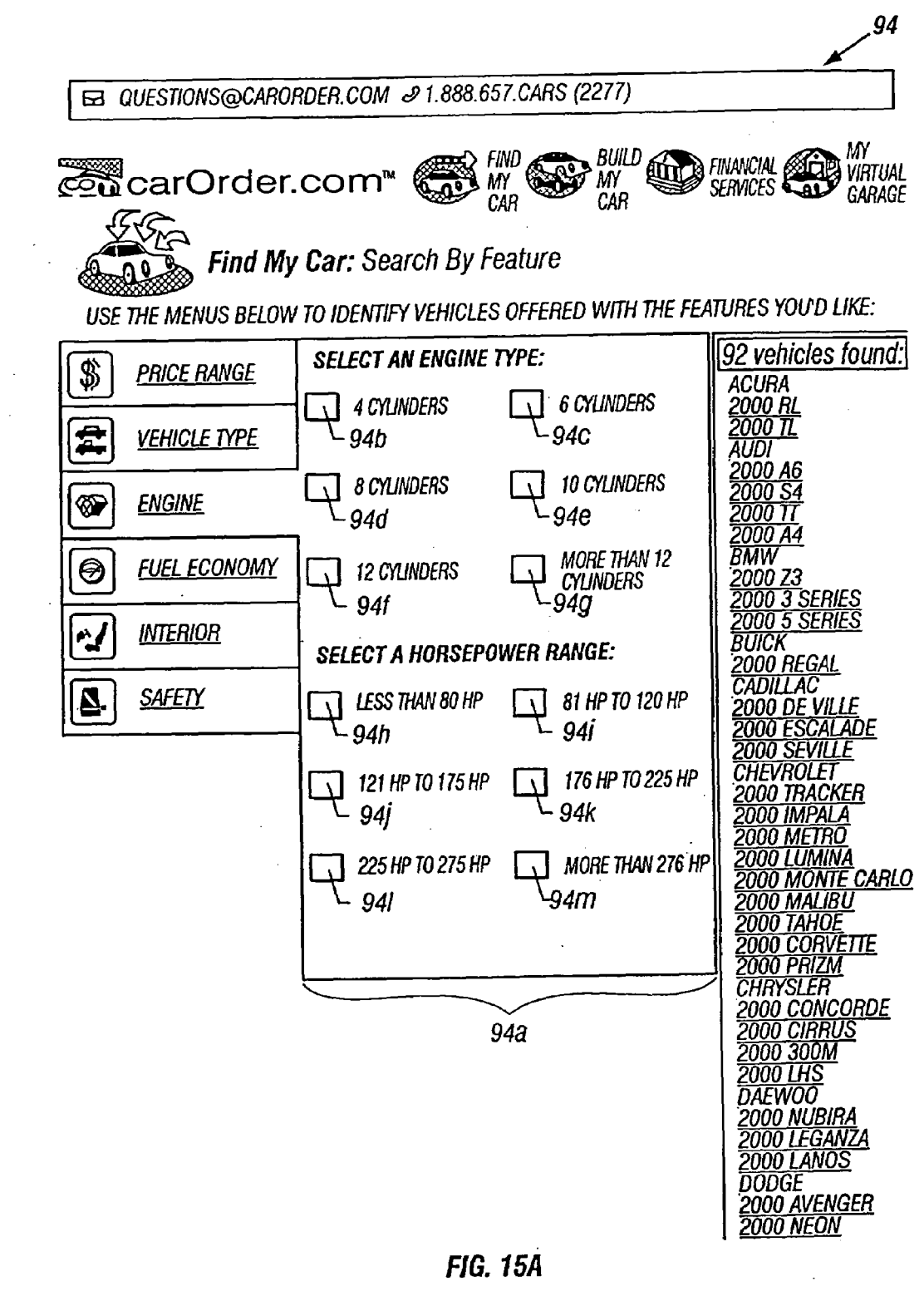

FIGS. 15a–c are plan views of a ninth web page through which a user can access product-related information that may be associated with the web page shown above in FIG. 6;

FIG. 16a–c are a plan views of a tenth web page through which a user can access product-related information that may be associated with the web page shown above in FIG. 6;

FIGS. 17a–c are plan views of an eleventh web page through which a user can access product-related information that may be associated with the web page shown above in FIG. 6;

FIG. 18a–c are plan views of a twelfth web page through which a user can access product-related information that may be associated with the web page shown above in FIG. 6;

FIG. 19 is a plan view of a thirteenth web page through which a user can access product-related information that may be associated with the web page shown above in FIG. 6;

FIG. 20 is a plan view of a web page through which a user can access product comparison features that may be associated with the web page shown above in FIG. 6;

FIG. 21 is a second plan view of a web page through which a user can access product comparison features that may be associated with the web page shown above in FIG. 6;

FIGS. 22a–c is a plan view of a fourteenth web page through which a user can access product-related information that may be associated with the web page shown above in FIG. 6;

FIG. 25 is a plan view of a seventeenth web page through which a user can access product-related information that may be associated with the web page shown above in FIG. 6;

The use of the same reference symbols in different drawings indicates similar or identical items.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

INTRODUCTION

The present invention facilitates commercial transactions over a network such as the Internet. More specifically, embodiments of the present invention facilitate comparison-price shopping over a network (e.g., the Internet) by allowing a user to easily store information regarding one or more products. Also included is a price availability feature that guarantees a price of a product associated with product-related information stored on a server. To that end, information concerning a given product is typically rendered on a display (e.g., a browser window). The information rendered typically includes data regarding the price at which a given product is offered. A server is typically employed to provide centralized storage of product information. A subportion of that storage is associated with an identification code. Acceptance of the offered price data is effected by storing the information in the subportion, and so defining an agreed price. The agreed price is maintained on the server in the absence of a predetermined system event. In a first embodiment, the predetermined system event may include an expiration of a preset amount of time. Alternatively, the predetermined system event may include dissociating the information from the subportion of storage. Although the product-related information may correspond to any known product, the present invention is discussed with respect to product-related information regarding automobiles, as will be seen in the subsequent discussion.

An Example Computing and Network Environment

Figure 1:
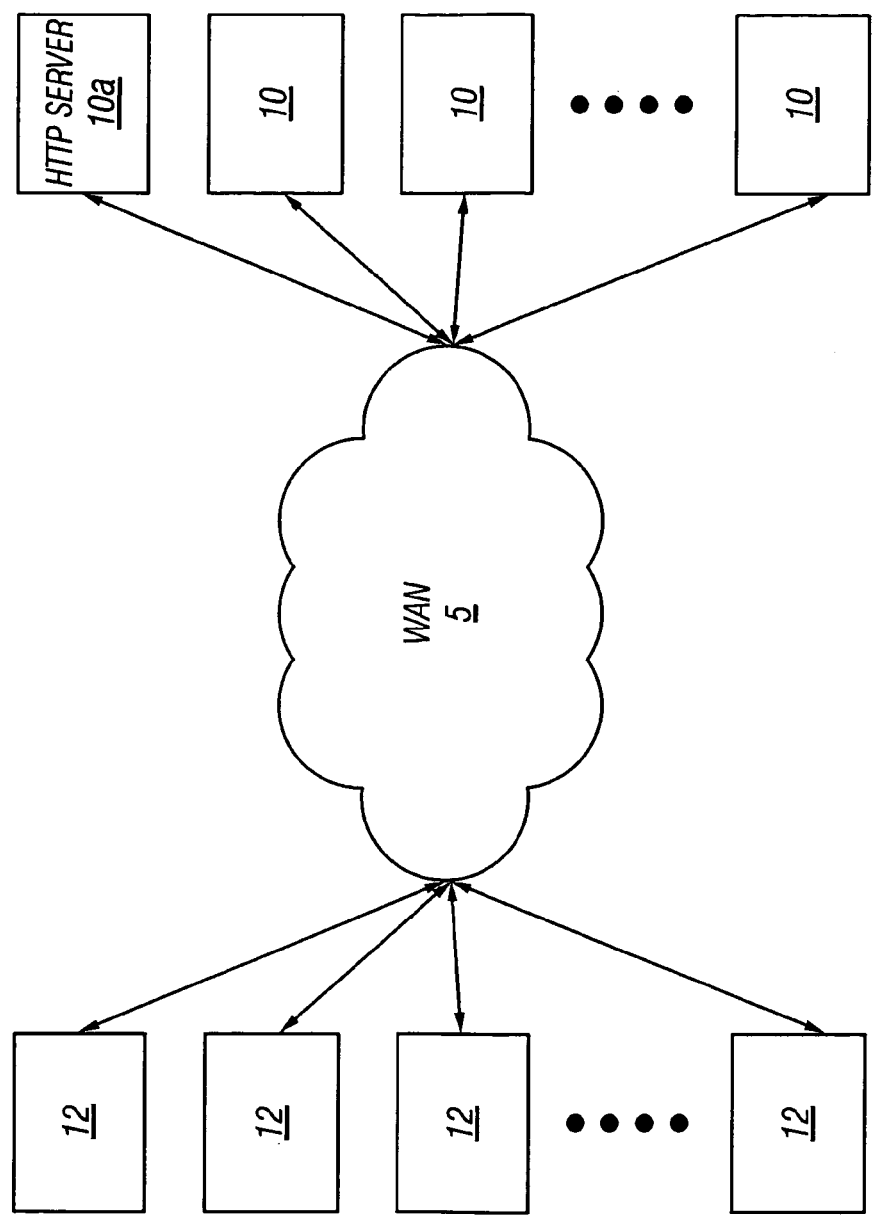
FIG. 1 is simplified plan view of a data network.

FIG. 1 is a block diagram of a wide area network (WAN) 5 (e.g., the Internet), which includes a number of networked servers 10 that are accessible by client terminals 12. Communication between servers 10 and client terminals 12 typically occurs over a publicly accessible network, such as a public switched telephone network (PSTN) over ASDL telephone lines or large bandwidth trunks (e.g., T1 or OC3). Client terminals 12 access servers 10 through an Internet service provider (ISP) by executing application specific software (e.g., a "browser") on a computer 14, shown in detail in FIG. 2.

Figure 2:
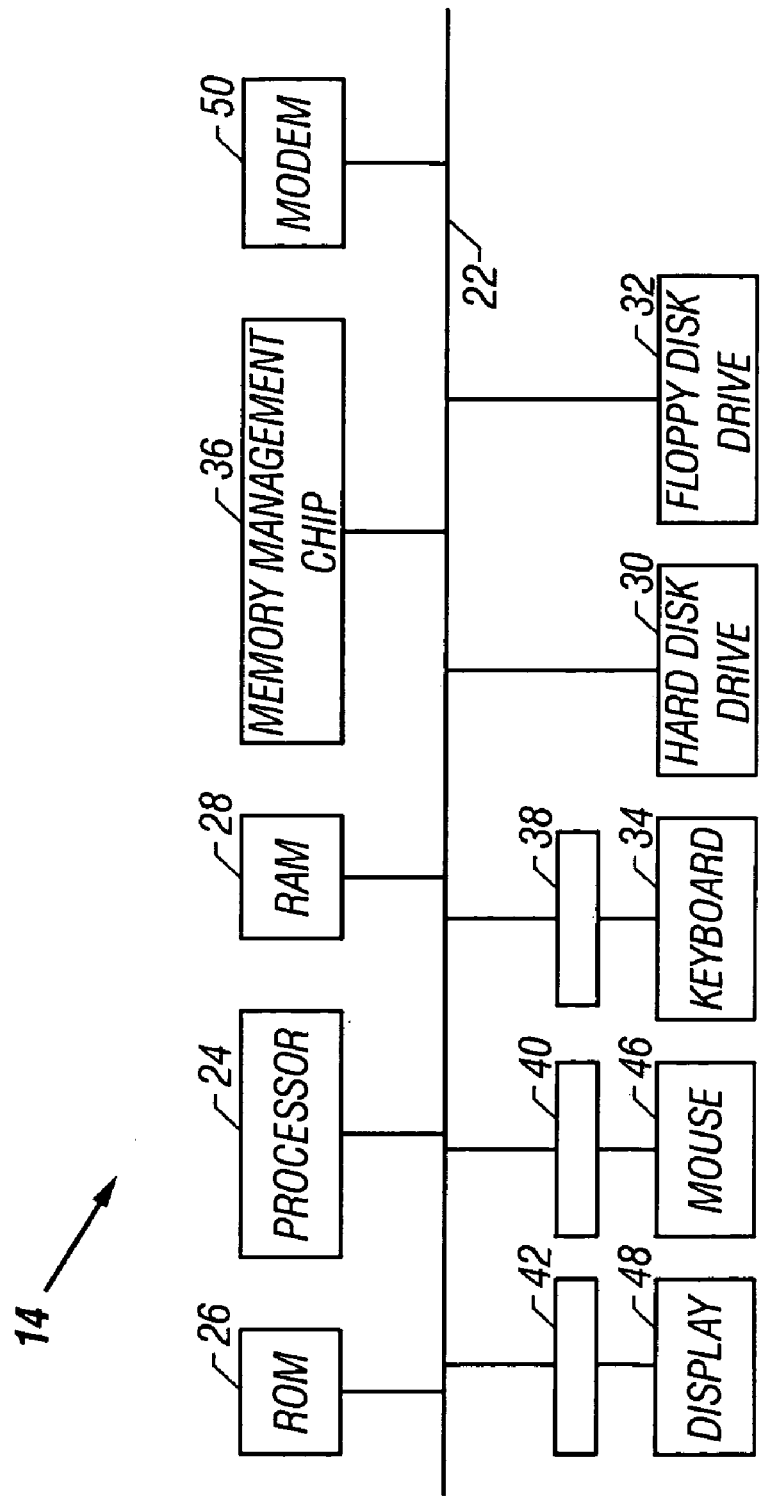
FIG. 2 is a block diagram of a client terminal shown above in FIG. 1.

FIG. 2 is a block diagram illustrating a computer such as computer 14. Computer 14 includes one or more system buses 22, which place various components of computer 14 in data communication. For example, a microprocessor 24 is placed in data communication with both a read only memory (ROM) 26 and a random access memory (RAM) 28 via system bus 22. ROM 26 contains, among other code, a Basic Input-Output System (BIOS), which controls basic hardware operations such as the interaction with peripheral components such as disk drives 30 and 32, as well as a keyboard 34. RAM 28 is the main memory into which the operating system and application programs are loaded. A memory management chip 36 is in communication with system bus 22 to control direct memory access (DMA) operations. DMA operations include passing data between RAM 28, and hard disk drive 30 and floppy disk drive 32. Also in communication with system bus 22 are various I/O controllers: a keyboard controller 38, a mouse controller 40, a video controller 42, and an audio controller 44. Keyboard controller 38 provides a hardware interface for keyboard 36, mouse controller 40 provides the hardware interface for a mouse 46, or other point-and-click device, and video controller 40 provides a hardware interface for a display 48. A modem 50 enables data communication over WAN 5, preferably facilitating data transmission speeds of at least 28.8 Kbps. The operating system of computer 14 may be MS-DOS™, WINDOWS™ 3.x, WINDOWS™ 95, WINDOWS™ NT 4.0, OS/2™, or other known operating system. Computer 14 also supports a number of Internet access tools, including, for example, an HTTP-compliant web browser, such as Netscape Navigator™, Microsoft Explorer™ or the like.

Referring to FIGS. 1 and 2, browser 54 employs, for example, a TCP/IP connection to pass a request to an HTTP server 10a running an HTTP "service" (e.g., under the WINDOWS™ operating system) or a "daemon" (e.g., under a UNIX™ operating system). The request is typically satisfied by contacting HTTP server 10a using a protocol that can be used to communicate between server 10a and one or more of client terminals 12 (e.g., HTTP). One of servers 10 then responds to the request, typically by sending a "web page" formatted as an HTML file. The browser interprets the HTML file and displays a visual representation of the web page using local resources (e.g., fonts, colors and the like).

An Example of a System Facilitating Commercial Transactions Over a Network

Figure 4:
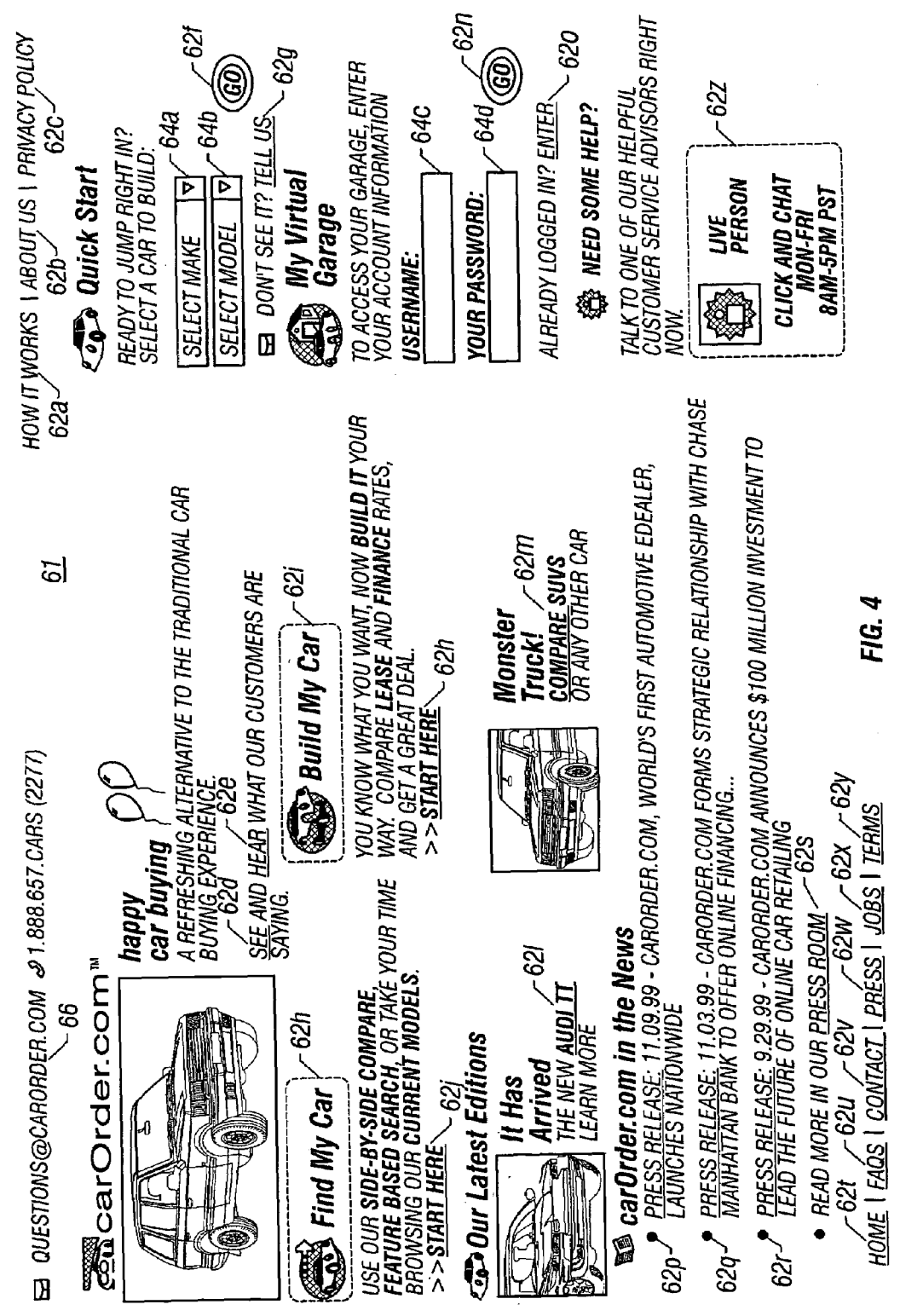

Referring to FIGS. 2, 3 and 4, a visual representation of a "web page" 56 is depicted as web page 56 would be presented, for example, on display 48. Web page 56 includes, inter alia, a hypertext link 58 (entitled "enter the site"). Employing mouse 46, a cursor 60 may be placed proximate to hypertext link 58, and a cursor event is effectuated (i.e., hypertext link 58 is activated). Activating hypertext link 58 results in a visual representation of a web page 61 being presented on display 48. In this manner, hypertext link 58 allows navigation to web page 61 by having the same displayed on display 48. Web page 61 includes a number of hypertext links 62 *a–z*, as well as a number of data entry fields 64*a–d*. Also included on webpage 61 is a link 66, which allows navigation to facilities that allow the propagation of information (e.g., over the Internet, via a file-transfer-protocol (FTP) or e-mail).

Hypertext links 62*a*, 62*b*, 62*c*, 62*t*, 62*u*, 62*v*, 62*w*, 62*x* and 62*y* are provide to inform users of certain information not germane to the present invention. For example, hypertext links 62*a* and 62*u* allow navigation to webpages that discuss how to use the website. Hypertext links 62*b*, 62*w*, 62*x* and 62*v* provide company information, such as summary of the company and its services, press releases, jobs available, and how to contact the company. Hypertext link 62*c* describes how privacy is maintained on the website. Hypertext link 62*t* allows navigation to web page 61, and hypertext link 62*y* allows navigation to information that discusses the terms and conditions for gaining access to the website.

Access to the present invention is gained through webpage 61 by activating a hypertext link 62*n*. Before activating hypertext link 62*n*, a user must either enter information corresponding to a preexisting account in data entry fields 64*c* and 64*d*, or register a new account. In this manner, a user may be associated with a subportion of the addresses in the address space of HTTP server 10*a*, and referred to herein as a Virtual Garage™. To restrict access to the aforementioned subportion of addresses, a code that corresponds to the user is associated with the Virtual Garage™. The aforementioned code includes a user-name and a password. To gain access to the Virtual Garage™, the user's user-name is entered in data entry field 64*c*, and the user's password is entered in data entry field 64*d*. As is standard with most password security, the user's password is not displayed in data entry field 64*d*.

In the case where a user attempts to gain access to the present invention for the first time, a hypertext link 62*o* allows navigation to an account registration webpage 65, shown in FIGS. 5*a*–5*c*. Account registration webpage 65 includes a number of data entry fields 65*a*–*s*, in which the user's personal information can be entered. Also included on account registration webpage 65 are data fields 66*a*–*b* and 67*a*–*j*. Data entry fields 66*a*–*b* indicate the level of restriction on dissemination of the information provided in data fields 65*a*–*s*. Information entered in data fields 67*a*–*i* indicates how the user came to obtain knowledge of the existence of account registration webpage 65.

A number of hypertext links can also be included on account registration webpage 65. For example, hypertext links 62*a*, 62*b*, 62*c*, 62*t*, 62*u*, 62*v*, 62*w*, 62*x* and 62*y* are the same as shown on webpage 62, and are as discussed above. Hypertext links 70*a*–*c* allow navigation to additional websites that may be in data communication with databases having information concerning products that are the subject of commercial transactions over the data network. For example, were automobiles to be sold, hypertext link 70*a* includes information concerning various models of automobiles; hypertext link 70*b* includes information concerning custom ordering an automobile to have desired features; and hypertext link 70*c* includes information concerning financing of an automobile to be purchased. Hypertext link 70*d*, on the other hand, allows navigation to a webpage having information concerning automobiles already selected by the user as being suitable for purchase, which is discussed more fully below.

Figure 6:
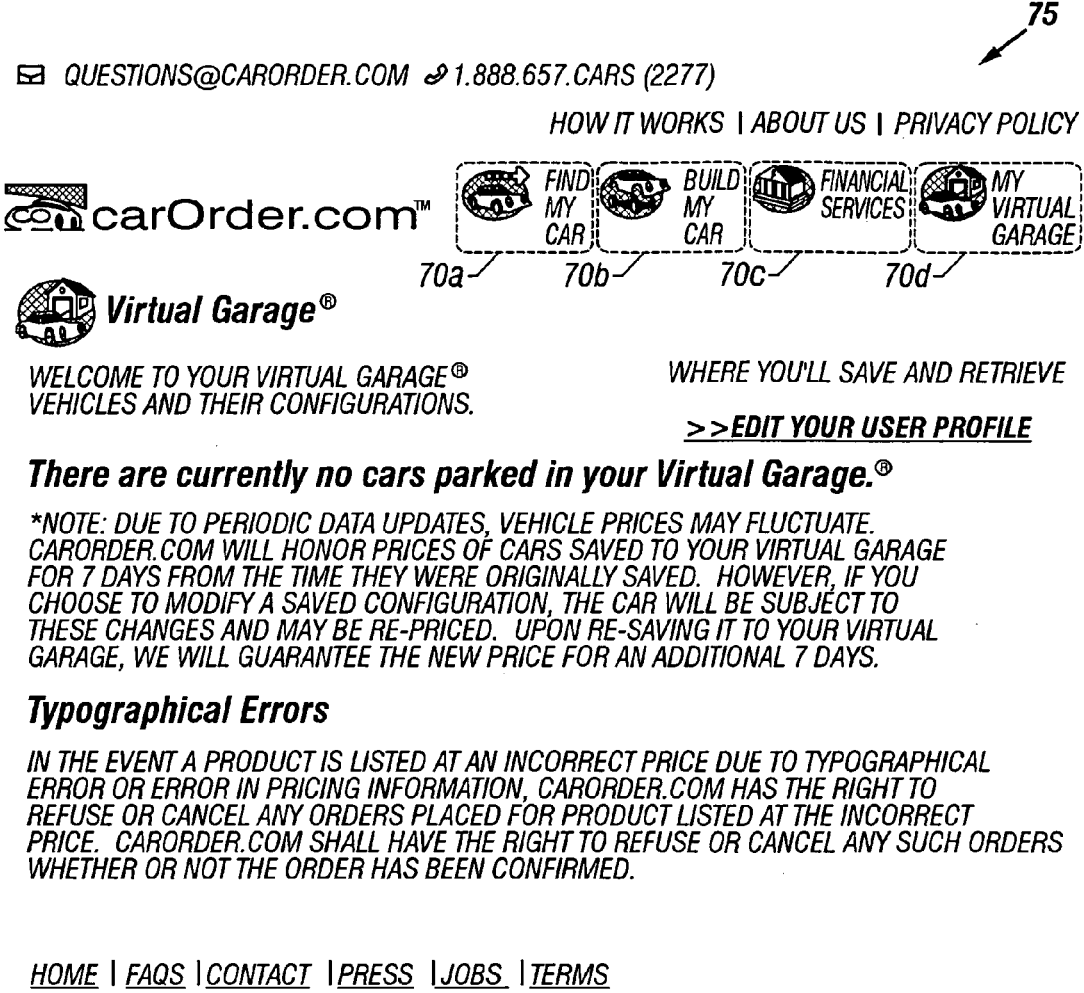
FIG. 6 is a plan view of a web page that is uniquely associated with a user and on which product-related information stored on a server is accessed.
Figure 13A:
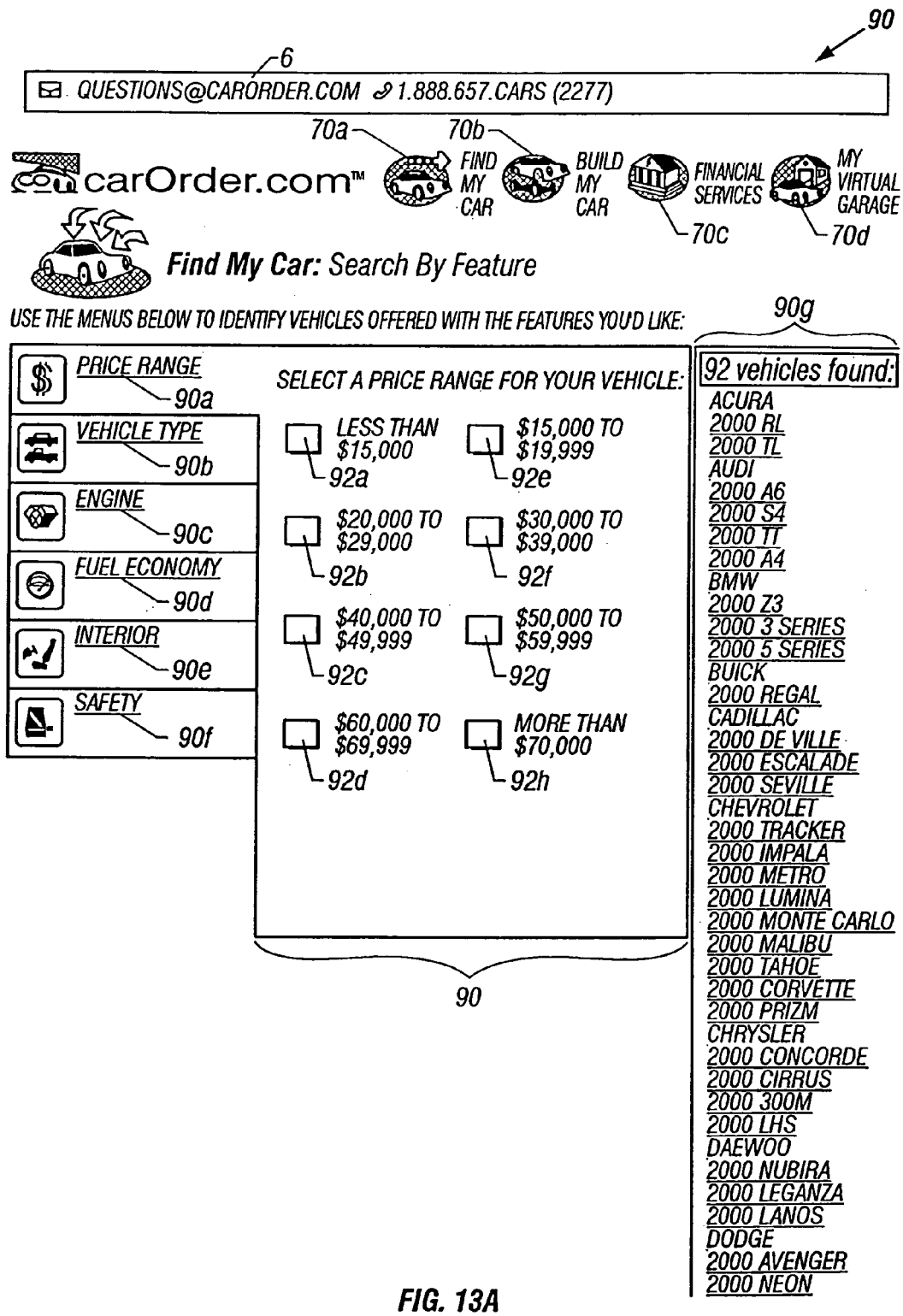
Figure 17A:
Figure 22A:
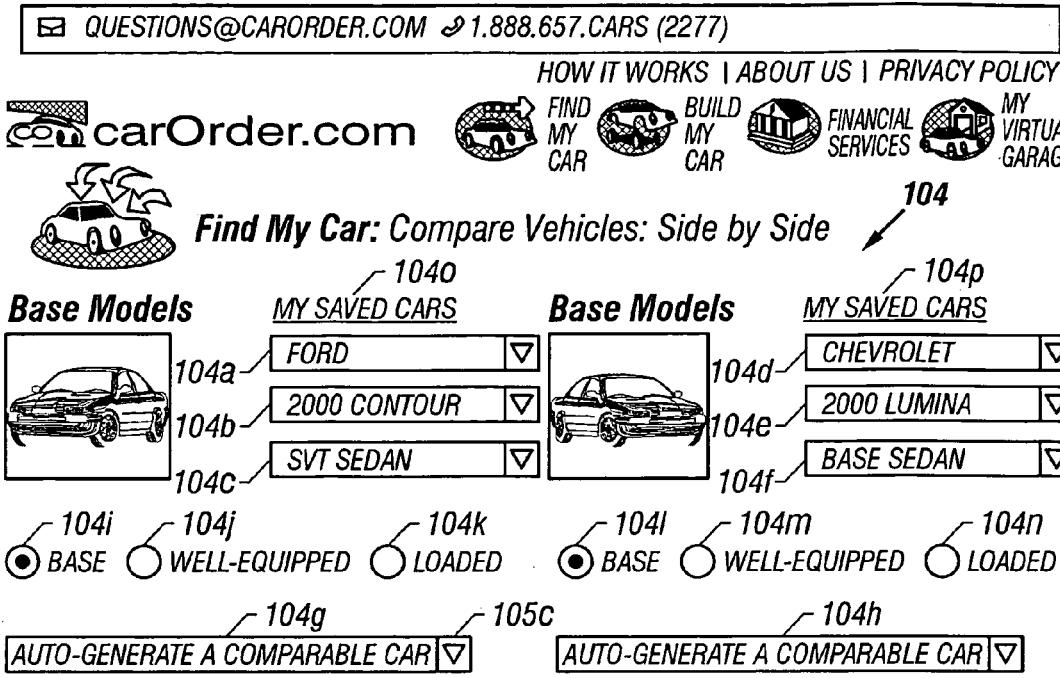
Figure 23:
FIG. 23 is a plan view of a fifteenth web page through which a user can access product-related information that may be associated with the web page shown above in FIG. 6.
Figure 24:
FIG. 24 is a plan view of a sixteenth web page through which a user can access product-related information that may be associated with the web page shown above in FIG. 6.
Figure 26:
FIG. 26 is a plan view of a eighteenth web page through which a user can access product-related information that may be associated with the web page shown above in FIG. 6.

Upon acceptance of the registration data entered into data entry fields 65*a*–*g*, Virtual Garage™ on server 10*a* is accessed by activating hypertext link 62*n*. Activation of hypertext link 62*n* causes navigation to a webpage 75, shown in FIG. 6. Web page 75 includes information concerning products that a user is interested in purchasing. To that end, web page 75 facilitates comparison price shopping by allowing a user to store product-related information concerning multiple products and examine that information. Information concerning various products (in this example, automobiles) can be obtained by activating either of hypertext links 70*a* or 70*b*. Activating hypertext link 70*a* navigates to a web page 80, shown in FIG. 7, which includes, inter alia, a number of hypertext links that enable access to a database of information related to automobiles. For example, hypertext links 80*a* and 80*d* allow access to a database concerning information organized by the make and model of the available automobiles. Hypertext links 80*c* and 80*f* allow access to the same database, but facilitate searching based upon the features associated with automobiles in the database. Hypertext links 80*b* and 80*e* facilitate comparison of automobiles associated with the aforementioned database with other automobiles associated therewith or with information stored by the user in the user's Virtual Garage™.

Referring to FIGS. 7, 8 and 9, the activation of hypertext links 80*a* or 80*d* allows navigation to a webpage 82. Webpage 82 includes a matrix 82*a* of hypertext links having titles associated with various automobile manufactures. In addition, a hypertext link 82*b* is present on webpage 82 that allows navigation to webpage 80. Activating the hypertext links in matrix 82*a* navigates to webpages having a listing of models of cars fabricated by the manufacturer associated with the hypertext link thus activated. For example, activating the hypertext link entitled "Ford" allows navigation to a webpage 84, which includes a brief description of different models of automobiles sold or manufactured under the "Ford"™. In addition, webpage 84 includes hypertext links 84*a*–*v* and 82*b*. Hypertext link 84*a* allows navigation to webpage 82 to allow a user to view models of automobiles associated with a different manufacturer.

Referring to FIGS. 9, 10, 11 and 12, hypertext links 84*b*–*v* allow a user to obtain more specific information concerning particular automobiles sold/fabricated by the given manufacturer. For example, hypertext links 84*b* and 84*c* allow navigation to a webpage 85 that recites more detailed information concerning the Taurus model of automobile in text region 85*a* entitled "overview." Webpage 85 also includes various hypertext links that facilitate obtaining additional information concerning the Taurus model of automobile (shown as hypertext links 85*b* and 85*c*).

For example, hypertext link 85*b* allows navigation to a webpage 86. Webpage 86 is similar to webpage 85, excepting recitations 86*a* concerning the performance characteristics of the Taurus model and the presence of hypertext link 86*a* that allows navigation to webpage 85. Hypertext link 85*c* allows navigation to a webpage 87, which in similar to webpage 85, excepting recitations 86*a* concerning the features available on the Taurus model. Also, unlike webpages 85 and 86, webpage 87 includes both hypertext links 85*a* and 86*b* that allow navigation to webpages 85 and 86, respectively.

Additionally, webpage 85 includes hypertext link 84a that allows a user to navigate to webpage 82 to choose information concerning automobiles associated with a different manufacturer. A hypertext link 85d allows a user to navigate to webpage 84 to obtain information related to a different model offered by the same manufacturer; Activating hypertext link 84d allows a user to choose different groups of features for the present model of automobile that are provided by the manufacturer, referred to as option packages. In this manner, a user is able to "build" a model of an automobile having the desired features.

Referring to FIGS. 7, 13a–c and 14a–c, from webpage 80, a user may search for a particular automobile based upon the features desired. To that end, hypertext links 80c and 80f allow navigation to a webpage 90. Webpage 90 includes a number of hypertext links 90a–f that allow navigation to different webpages containing information concerning various features available on a list of automobiles recited in a column 90g. Also included on webpage 90 are hypertext links 70a–d, as well as a hypertext link 66. Webpage also includes a data entry region 90h having a number of data entry fields 92a–h. Each of the data entry fields 92a–h corresponds to a range of values. One or more of data entry fields 92a–h can have data entered therein to indicate the price of a vehicle in which a user is interested. Hypertext link 90b allows navigation to a webpage 93. Webpage 93 is similar to webpage 90, excepting a data entry region 93a which includes a number of data entry fields 93b–n that correspond to characteristics of an automobile, such as different body styles, drive trains and engine locations.

Referring to FIGS. 13a and 15a–c, hypertext link 90c allows navigation to a web page 94. Webpage 94 is similar to webpage 90, excepting a data entry region 94a which includes a number of data entry fields 94b–m that correspond to the characteristics of the engine associated with the automobile being configured. The aforementioned characteristics include the horsepower and the number of cylinders.

Referring to FIGS. 13a and 16a–c, hypertext link 90d allows navigation to a web page 95. Webpage 95 is similar to webpage 90, excepting data entry region 95a that includes a number of data entry fields 95b–i that correspond to fuel economy of the automobile being configured. As a result, a user may select an automobile based upon a desired fuel economy that the automobile must achieve.

Referring to FIGS. 13a and 17a–c, hypertext link 90e allows navigation to web page 96. Webpage 96 is similar to webpage 90, excepting data entry region 96a which includes a number of data entry fields 94b–n that correspond to the characteristics an automobile's interior. The aforementioned characteristics may include the type of seats included with the automobile (e.g., bench or bucket seats), as well as the upholstery thereof. Additionally, the type of sound system may be chosen from data entry regions 96i–n.

Referring to FIGS. 13a and 18a–c, hypertext link 90f allows navigation to a web page 97. Webpage 97 is similar to webpage 90, excepting a data entry region 97a, which includes a number of data entry fields 97b–h that correspond to the safety characteristics of the automobile being configured. This allows selecting automobiles based upon the available safety restraint systems associated therewith (e.g., driver-side airbag, integrated child safety seat, roadside assistance, and the like).

Referring to FIGS. 7 and 19, from webpage 80 a user may also select automobiles based upon side-by-side comparisons. To that end, hypertext links 80b and 80e allow navigation to a webpage 100. Webpage 100 has a number of floating frames 100a–f and data entry regions 100g–p. A subset of floating frames 100a–f (floating frames 100a–c) and a subset of data entry regions 100g–p (data entry regions 100g–k) are associated with product information concerning a first automobile. The remaining ones of floating frames 100a–f (floating frames 100d–f) and the remaining ones of data entry regions 100g–p (data entry regions 100l–p) are associated with product information concerning a second automobile.

To compare product-related information of two automobiles, one of data entry regions 100g and 100h is selected. For example, to compare information stored in the user's Virtual Garage™, data entry region 100h is activated. For the present discussion, it is assumed that data entry region 100g is activated. Floating frame 100a is entitled "select make" and includes a virtual button 101a. Activating the virtual button expands floating frame 100a. This enables a user to scroll through a list of automobile manufacturers and select a particular manufacture, for the first automobile, by highlighting the same and effectuating a cursor event. The remaining floating frames (floating frames 101b and 101c), entitled select model and select trim, respectively, operate in a manner similar to floating frame 101a. This enables a user to select the first automobile based upon the manufacturer, model and trim. The second automobile is selected in a similar fashion using floating frames 100d–f and data entry regions 100l–p.

Referring to FIGS. 7 and 19, if the user desires to compare product-related information concerning the second automobile with product-related information stored in the Virtual Garage™, data entry region 100h is made the subject of a cursor event, navigating to a web page 102. Webpage 102 is identical to webpage 100, excepting for the absence of floating frames 100a–c. In place of floating frames 100a–c, a floating frame 100q is present and is entitled "select garage car". Activating virtual button 101b that is associated with floating frame 100q expands floating frame 100q to enable a user to scroll through a list of automobiles for which information is stored in the user's Virtual Garage™.

Referring to FIGS. 20, 21 and 22a–c, after selecting the make, model and trim for the two automobiles to be compared on webpage 102, the user navigates to a webpage 103. Webpage 103 is identical to webpage 102 except for the inclusion of a hypertext link 100r entitled "compare". Hypertext link 100r allows navigation to a webpage 104. In addition to including product-related information, webpage 104 includes six floating frames 104a–f that correspond to floating frames 100a–f, as well as six data entry regions 104i–n that correspond to data entry regions 100i–k and 100n–p. Two additional floating frames are included on webpage 104 (floating frames 104g and 104h), entitled "auto-generate a comparable car", as well as two hypertext links (hypertext links 104o and 104p). The product-related information is arranged in two columns (columns 105a and 105b), with information concerning the first automobile recited in column 105a and that concerning the second automobile recited in column 105b. The information is preferably arranged so that analogous, or common, characteristics of the two automobiles are recited in a common row. For example, information concerning the transmission of the first automobile in column 105a should be directly across from the transmission information concerning the second automobile recited in column 105b. In this manner, a user may quickly and easily compare the characteristics of the two (or more) automobiles.

Should the user desire to vary the product-related information being compared, the user can change the information in either of columns 105a and 105b. To that end, the user can use floating frames 104a–104f to select a different manufacturer and/or model, as well a trim, as discussed above with respect to webpage 100. Alternatively, hypertext links 104o and/or 104p can be activated to obtain product-related information stored in the Virtual Garage™. Finally, the user can employ floating frame 104g to cause server 10a (which hosts software implementing the Virtual Garage™) to automatically generate information concerning an automobile that is comparable to that for which information is displayed in column 105a. To effect such generation, a user activates a virtual button 105c to select a criteria by which to seek a comparable automobile. The criteria can include, for example, price and/or features. In a similar fashion, the product-related information in column 105b can also be varied through the use of floating frame 104h.

Referring to FIGS. 22a–c, 23 and 24, hypertext links 105f and 105g can be activated in order to save product-related information in column 105a and column 105b, respectively. For example, hypertext link 105f allows navigation to a webpage 106, which includes a hypertext link 106a. Activation of hypertext link 106a saves the product-related information concerning the first automobile, recited in column 105a, in the user's Virtual Garage™. From webpage 106, a user may also vary the product-related information concerning the first automobile before saving that vehicle to the user's Virtual Garage™. To that end, a number of data entry regions 106b–g corresponding to differing exterior and interior colors are provided. Additionally, by activating a hypertext link 106h, information concerning the first automobile can be varied by selecting differing option packages associated with the model selected for the first automobile. Hypertext link 106h allows navigation to a webpage 108, which includes data entry regions 108a–i. Data entry regions 108a–i allow selection between different options provided by the manufacturer. From webpage 108, information concerning the first automobile can be saved to the user's Virtual Garage™ by activation of a hypertext link 108j. Finally, activation of a hypertext link 108k allows a user to obtain an updated price for the vehicle.

Referring to FIGS. 6, 7, 24, 25 and 26, a user may obtain product-related information concerning an automobile by activating hypertext link 70b, and in so doing navigates to a webpage 110. Webpage 110 includes floating frames 110a, 110b and 110c that serve functions identical to floating frames 100a, 100b and 100c (shown on webpage 100). Also included on webpage 110 is a hypertext link 110d that allows navigation to webpage 80 to facilitate researching information concerning product-related information, as discussed above. Once the desired information is selected in floating frames 110a, 110b and 110c, the user navigates to a webpage 111. Webpage 111 in identical to webpage 110 except that additional hypertext links (hypertext links 111a, 111 b, 111c and 111d) are provided. In addition, summary product-related information 111e (corresponding to the make, model and trim selected) is also displayed on webpage 111. Hypertext link 111a allows navigation to webpage 84, providing a list of models associated with the manufacturer selected in floating frame 110a. Hypertext link 111b allows navigation to a webpage 112, which provides a list of option packages provided by the manufacturer selected in floating frame 110a. Hypertext link 110c allows navigation to webpage 85, which includes the information discussed above, and hypertext link 111d allows navigation to webpage 106. As mentioned above, webpage 106 includes data entry regions 106b–g, which correspond to differing exterior and interior colors that are provided by the manufacturers, as well as a hypertext link 106h that allows navigation to webpage 108 to facilitate selection of different options provided by the manufacturer selected in floating frame 110a. In this manner, a user may save the product-related information thus generated to the user's Virtual Garage™.

Figure 27:
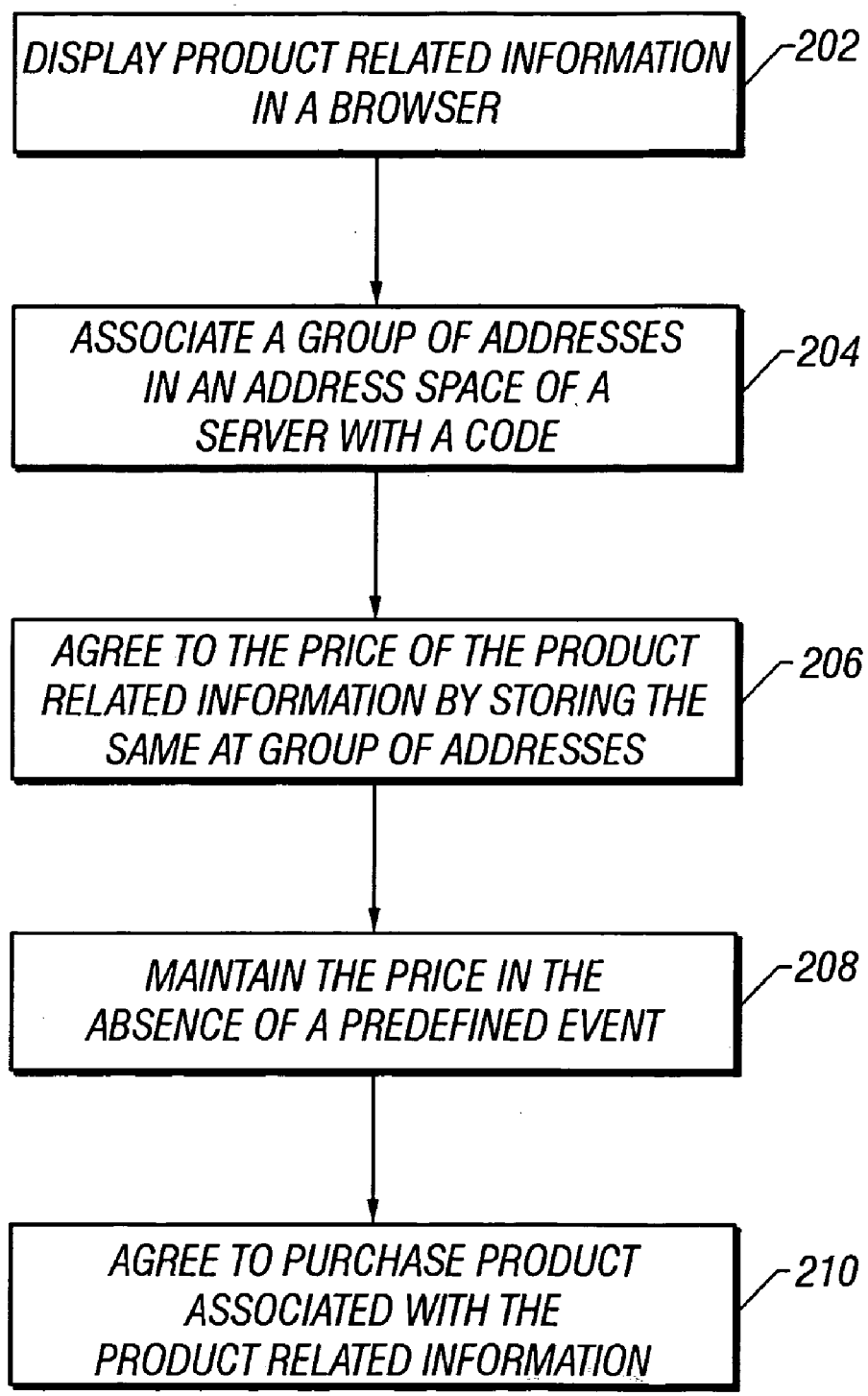
FIG. 27 is a flow diagram showing a method in accordance with the present invention.

To that end, referring to FIGS. 1 and 27, a user views product-related information displayed in a browser window (step 202). The user then associates a group of the addresses of the address space of server 10a with a code (step 204). The product-related information includes the product's price. The user then agrees to the price of the product associated with the product-related information by storing the same in the aforementioned group of addresses (step 206). The aforementioned price is maintained in the absence of a predefined system event, such as the expiration of a predetermined time period (step 208). For example, were the product-related information stored in the aforementioned group of addresses for longer than seven days without the user agreeing to purchase the product associated therewith, the price associated therewith might then be modified at server 10a. Additionally, changes in any of the information associated with the product-related information stored in the aforementioned group of addresses prior to the user agreeing to purchase the product associated therewith can also result in modification of the price stored at server 10a. This is demonstrated by assuming product-related information concerning an automobile is stored at the aforementioned subgroup of addresses and then the trim associated with the automobile changes before the user agrees to purchase the automobile. In this scenario, the price of the automobile can be changed at server 10a, resulting in the user having to pay the new price. Otherwise, the price agreed to by the user is the price of the product associated with the product-related information at the time the user agreed to the purchase (step 210).

Although the foregoing method has been described with step 204 occurring after step 202, step 204 could occur at any point during the method so long as step 204 precedes step 206. In addition, the embodiment discussed above illustrates a use of the present invention for facilitating commercial transactions over a data network involving automobiles. It should be understood, however, that the present invention can also be applied to commercial transactions involving any product, such as furniture, cleaning products, maid services, travel services and the like.

Thus, while particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method, employing a browser in data communication over a network with a server, for determining a price of a product, said method comprising:
    providing information concerning said product for display in a browser window, said information including a first offered price of said product;
    receiving information from said browser indicating an agreement by a user of the browser of said first offered price for said product;
    storing product related information including said first offered price, wherein said product is configured with multiple features, said stored product related information includes said features of said product and said stored product related information is associated with an identification code corresponding to said user of the browser;

receiving a purchase request associated with said identification code, wherein the purchase request indicates an agreement to purchase said product for said first offered price;

prior to responding to said purchase request, determining if an event has occurred prior to receiving said purchase request to cause modification of the first offered price, wherein the event that caused modification of the first offered price is unrelated to any data received from said user subsequent to storing said product related information; and changing said first offered price of said product to a second offered price of said product in response to said event that caused modification of the first offered price.

2. The method as recited in claim 1 wherein said event is a predetermined event that includes expiration of a preset amount of time.

3. The method as recited in claim 2 wherein said preset time is in a range of one to ten days.

4. The method as recited in claim 1 wherein said event is a predetermined event that includes changes in said product related information associated with said product.

5. The method as recited in claim 1 wherein said information corresponds to characteristics of an automobile.

6. The method as recited in claim 1 wherein changing said first offered price comprises:
varying one or more features with which said product is configured.

7. The method as recited in claim 1 wherein said first offered price includes tax information associated with a geographic region and a manufacture's suggested retail price (MSRP), and said changing said agreed price comprises:
varying said MSRP independently of said tax information.

8. The method as recited in claim 1 wherein said event corresponds to a change in a specification of said product.

9. The method as recited in claim 1 wherein agreement to said price is effected by storing said product-related information in said subportion of said addresses associated with said server.

10. A computer system comprising:
a processor;
a network interface, coupled to said processor and coupled to a client computer via a network, wherein said network interface permits said client computer to be in data communication over said network with said processor;
computer readable medium coupled to said processor; and
computer code, encoded in said computer readable medium, for determining a price of a product by virtue of being configured to cause said processor to:
provide information concerning said product for display by a client computer coupled to the, said display information including a first offered price of said product;
receive information from said client computer indicating an agreement by a user of the client computer of said first offered price for said product;
store product related information including said first offered price data, wherein said product is configured with multiple features, said stored product related information includes said features of said product, and said stored product related information is associated with an identification code corresponding to the user of the client computer;
receive a purchase request associated with said identification code, wherein the purchase request indicates an agreement to purchase said product for said first offered price;
determine, prior to responding to said purchase request if an event has occurred prior to receiving said purchase request to cause modification of the first offered price, wherein the event that caused modification of the first offered price is unrelated to any data received from said user subsequent to storage of said product related information; and
change said first offered price of said product to a second offered price of said product in response to the event that caused modification of the first offered price.

11. The computer system as recited in claim 10 wherein said event is a predetermined event that includes expiration of a preset amount of time.

12. The computer system as recited in claim 11 wherein said preset amount of time is in a range of one to ten days.

13. The computer system as recited in claim 10 wherein said event is a predetermined event that includes changes in said product related information associated with said product.

14. The computer system as recited in claim 10 wherein said information corresponds to characteristics of an automobile.

15. The computer system as recited in claim 10 wherein said code to change said first offered price is further configured to cause said processor to:
vary one or more features with which said product is configured.

16. The computer system as recited in claim 10 wherein said first offered price includes tax information associated with a geographic region and a manufacture's suggested retail price (MSRP), and said computer code configured to cause said processor to change said first offered price is further configured to cause said processor to:
vary said MSRP independently of said tax information.

17. The computer system as recited in claim 10 wherein said event corresponds to a change in a specification of said product.

18. The computer system as recited in 10 wherein agreement to said first offered price is effected by code to cause the processor to store said product-related information in a subportion of addresses associated with said server.

19. A computer program storage medium for operation on a server computer system in data communication over a network with at least one client computer system employing a browser application, the computer program product comprising code for determining a price of a product, said computer program storage medium comprising:
for each client computer system:
code to provide display information to said browser application concerning said product, said display information including a first offered price of said product;
code to associate an identification code corresponding to a user of said client system;
code to receive product-related information from said client computer system indicating an acceptance of said first offered price;
code to store said product-related information, wherein said product is configured with multiple features, said stored product related information includes said features of said product, and said stored product related information is associated with said identification code;

code to receive a purchase request associated with said identification code, wherein the purchase request indicates an agreement to purchase said product for said first offered price;

code to determine, prior to responding to said purchase request, if an event has occurred prior to receiving said purchase request to cause modification of the first offered price, wherein the event that caused modification of the first offered price is unrelated to any data received from said user subsequent to storage of said product related information; and code to change said first offered price of said product to a second offered price of said product in response to the event that caused modification of the first offered price.

20. The computer program storage medium as recited in claim 19 wherein event is a predetermined event that includes expiration of a preset amount of time.

21. The computer program storage medium as recited in claim 20 wherein said preset amount of time is in a range of one to ten days.

22. The computer program storage medium as recited in claim 19 wherein said event is a predetermined event that includes changes in said product related information associated with said product.

23. The computer program storage medium as recited in claim 19 wherein said information corresponds to characteristics of an automobile.

24. The computer program storage medium as recited in claim 19 wherein said code to change said first offered price is further configured to cause said processor to:

code to vary one or more features with which said product is configured.

25. The computer program storage medium as recited in claim 19 wherein said first offered price includes tax information associated with a geographic region and a manufacture's suggested retail price (MSRP), and said computer code configured to cause said processor to change said first offered price is further configured to cause said processor to:

code to vary said MSRP independently of said tax information.

26. The computer program product as recited in claim 19 wherein said event corresponds to a change in a specification of said product.

27. The computer program storage medium as recited in claim 19 wherein agreement to said first offered price is effected by code to cause the processor to store said product-related information in a subportion of addresses associated with said server.

28. An apparatus, employing a browser in data communication over a network with a server, for determining a price of a product, said apparatus comprising:

means for providing information concerning said product for display in a browser window, said information including a first offered price of said product;

means for receiving information from said browser indicating an agreement by a user of the browser of said first offered price for said product;

means for storing product related information including said first offered price, wherein said product is configured with multiple features, said stored product related information includes said features of said product and said stored product related information is associated with an identification code corresponding to the user of the browser;

means for receiving a purchase request associated with said identification code, wherein the purchase request indicates an agreement to purchase said product for said first offered price;

means for determining, prior to responding to said purchase request, if an event has occurred prior to receiving said purchase request to cause modification of the first offered price, wherein the event that caused modification of the first offered price is unrelated to any data received from said user subsequent to storage of said product related information; and means for changing said first offered price of said product to a second offered price of said product in response to the event that caused modification of the first offered price.

29. The apparatus as recited in claim 28 wherein said event is a predetermined event that includes expiration of a preset amount of time.

30. The apparatus as recited in claim 29 wherein said preset amount of time is in a range of one to ten days.

31. The apparatus as recited in claim 28 wherein said event is a predetermined event that includes changes in said product related information associated with said product.

32. The apparatus as recited in claim 28 wherein said information corresponds to characteristics of an automobile.

33. The apparatus as recited in claim 29 wherein said changing said first offered price comprises:

means for varying one or more features with which said product is configured.

34. The apparatus as recited in claim 28 wherein said first offered price includes tax information associated with a geographic region and a manufacture's suggested retail price (MSRP), and said changing said agreed price comprises:

means for varying said MSRP independently of said tax information.

35. The apparatus as recited in claim 28 wherein said event corresponds to a change in a specification of said product.

36. The apparatus as recited in claim 28 wherein agreement to said first offered price is effected by means for storing said product-related information in a subportion of addresses associated with said server.

37. A method of operating a server computer system for determining a price of a product, said server computer system having a plurality of addresses in an address space associated therewith and said server computer system is in data communication over a network with at least one client system employing a browser application, the method comprising:

for each client computer system:

providing display information to said browser application concerning said product, said information including a first offered price of said product;

associating a subportion of said plurality of server addresses with an identification code corresponding to said client system;

receiving product-related information from said client computer system indicating an acceptance of said first offered price;

storing said received product-related information and said first offered price in said subportion of said plurality of server addresses, wherein the accepted first offered price defines an agreed price;

receiving a purchase request associated with said identification code, wherein the purchase request indicates an agreement to purchase said product for said first offered price;

prior to responding to said purchase request, determining if an event has occurred prior to receiving said purchase request to cause modification of the first offered price, wherein the event that caused modification of the first offered price is unrelated to any data received from said user subsequent to storing said product related information; and changing said agreed price of said product to a second offered price of said product in response to the event that caused modification of the first offered price.

38. The method as recited in claim 37 wherein event is a predetermined event that includes expiration of a preset amount of time.

39. The method as recited in claim 38 wherein said preset amount of time is in a range of one to ten days.

40. The method as recited in claim 37 wherein said event is a predetermined event that includes changes in said product related information associated with said product.

41. The method as recited in claim 37 wherein said information corresponds to characteristics of an automobile.

42. The method as recited in claim 37 wherein changing said agreed price comprises:

varying one or more features with which said product is configured.

43. The method as recited in claim 37 wherein said first offered price includes tax information associated with a geographic region and a manufacture's suggested retail price (MSRP), and changing said agreed price comprises:

varying said MSRP independently of said tax information.

44. The method as recited in claim 37 wherein said event corresponds to a change in a specification of said product.

45. The method of claim 37 wherein agreement to said first offered price is effected by storing said product-related information in a subportion of addresses associated with said server.

* * * * *